(12) United States Patent
Hirai

(10) Patent No.: US 7,768,905 B2
(45) Date of Patent: Aug. 3, 2010

(54) PROGRAM AND METHOD FOR CONTROLLING COMMUNICATION

(75) Inventor: Koichi Hirai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 632 days.

(21) Appl. No.: 11/087,273

(22) Filed: Mar. 23, 2005

(65) Prior Publication Data
US 2005/0180432 A1    Aug. 18, 2005

Related U.S. Application Data

(63) Continuation of application No. PCT/JP03/02277, filed on Feb. 27, 2003.

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/28* | (2006.01) |
| *H04L 12/56* | (2006.01) |

(52) U.S. Cl. ............................ 370/217; 370/397; 714/2
(58) Field of Classification Search ......... 370/216–221, 370/397, 399, 409, 241, 242, 244; 714/1, 714/2, 4
See application file for complete search history.

(56) References Cited

U.S. PATENT DOCUMENTS

| | | | | |
|---|---|---|---|---|
| 5,182,751 A | * | 1/1993 | Bales et al. | 370/410 |
| 5,621,722 A | * | 4/1997 | Edmaier et al. | 370/390 |
| 5,828,652 A |   | 10/1998 | Bales et al. | |
| 5,841,780 A | * | 11/1998 | Bales et al. | 370/524 |
| 5,862,335 A | * | 1/1999 | Welch et al. | 709/224 |
| 6,069,894 A | * | 5/2000 | Holender et al. | 370/397 |
| 6,246,665 B1 | * | 6/2001 | Watanabe et al. | 370/218 |
| 6,301,254 B1 | * | 10/2001 | Chan et al. | 370/397 |
| 6,308,281 B1 | * | 10/2001 | Hall et al. | 714/4 |
| 6,314,464 B1 | * | 11/2001 | Murata et al. | 709/226 |
| 6,314,525 B1 |   | 11/2001 | Mahalingham et al. | |

(Continued)

FOREIGN PATENT DOCUMENTS

AT    9739257    4/1998

(Continued)

*Primary Examiner*—Kevin C Harper
*Assistant Examiner*—Xavier Szewai Wong
(74) *Attorney, Agent, or Firm*—Greer, Burns & Crain, Ltd.

(57) ABSTRACT

To prevent communication between processes of different computers from being interrupted due to a trouble in one transmission route. A communication controller of a computer selects at least one of communication devices and establishes physical connections via the selected communication devices, in response to a connection request from a prescribed process. The communication controller defines the one or more established physical connections as a logical connection. When a trouble happens in a physical connection included in the logical connection, the communication controller establishes another physical connection via a communication device different from that of the troubled physical connection and includes this physical connection in the logical connection. When receiving a communication request applied to the logical connection, from the process, the communication controller performs communication via the physical connections included in the logical connection, in response to the communication request.

7 Claims, 33 Drawing Sheets

U.S. PATENT DOCUMENTS

| | | | |
|---|---|---|---|
| 6,473,396 B1 * | 10/2002 | Kumar | 370/220 |
| 6,763,479 B1 * | 7/2004 | Hebert | 714/4 |
| 7,046,619 B2 * | 5/2006 | Alagar et al. | 370/216 |
| 7,134,040 B2 * | 11/2006 | Ayres | 714/4 |
| 7,145,865 B1 * | 12/2006 | Meggison et al. | 370/216 |
| 2002/0016874 A1 | 2/2002 | Watanuki et al. | |
| 2002/0021659 A1 * | 2/2002 | Meijen et al. | 370/217 |
| 2002/0105949 A1 | 8/2002 | Shinomiya | |
| 2003/0043736 A1 * | 3/2003 | Gonda | 370/218 |
| 2003/0128706 A1 * | 7/2003 | Mark et al. | 370/395.1 |
| 2005/0240315 A1 * | 10/2005 | Booth et al. | 700/295 |

FOREIGN PATENT DOCUMENTS

| | | |
|---|---|---|
| CA | 2 213 467 | 3/1998 |
| CA | 2 459 027 | 12/2002 |
| EP | 0 836 355 | 4/1998 |
| GB | 2 371 706 | 7/2002 |
| JP | 9-326810 | 12/1997 |
| JP | 10-173773 | 6/1998 |
| JP | 10-320327 | 12/1998 |
| JP | 2002-026909 | 1/2002 |
| JP | 2002-232427 | 8/2002 |
| WO | WO 00/28715 | 5/2000 |

* cited by examiner

111 COMMUNICATION MANAGEMENT INFORMATION TABLE

| STATUS OF OWN PROCESS | LOGICAL COMMUNI- CATION MANAGEMENT IDENTIFIER | OWN CON- NECTION IDENTIFIER | PARTNER CON- NECTION IDENTIFIER | PHYSICAL COMMUNI- CATION | OWN COMMUNI- CATION IDENTIFIER | PARTNER COMMUNI- CATION IDENTIFIER | RE- CONNECTION AVAILABILITY | ESTABLISH- MENT |
|---|---|---|---|---|---|---|---|---|
| SERVER | C1 | 1 | 2 | P1 | 10 | 18 | Y | Y |
| CLIENT | C2 | 1 | 2 | P2 | 11 | 18 | Y | Y |

FIG. 6

113 PHYSICAL MANAGEMENT INFORMATION TABLE

| PHYSICAL COMMUNICATION MANAGEMENT IDENTIFIER | LOGICAL COMMUNICATION MANAGEMENT IDENTIFIER | COMMUNI-CATION NUMBER | ROUTE INFOR-MATION | COMMUNI-CATION STATE |
|---|---|---|---|---|
| P1 | C1 | 1 | AX | Y |
| P2 | C11 | 1 | BY | Y |

COMMUNICATION MANAGEMENT INFORMATION TABLE

| STATUS OF OWN PROCESS | LOGICAL COMMUNICATION MANAGEMENT IDENTIFIER | OWN CONNECTION IDENTIFIER | PARTNER CONNECTION IDENTIFIER | PHYSICAL COMMUNICATION | OWN COMMUNICATION IDENTIFIER | PARTNER COMMUNICATION IDENTIFIER | RECONNECTION AVAILABILITY | ESTABLISHMENT |
|---|---|---|---|---|---|---|---|---|
| SERVER | C1 | 1 | — | — | 10 | — | — | N |
| CLIENT | C2 | 2 | 1 | — | 99 | 10 | Y | N |

PHYSICAL MANAGEMENT INFORMATION TABLE

| PHYSICAL COMMUNICATION MANAGEMENT IDENTIFIER | COMMUNICATION NUMBER | ROUTE INFORMATION | COMMUNICATION STATE |
|---|---|---|---|
| — | — | — | — |
| — | — | — | — |

(ST2)

COMMUNICATION MANAGEMENT INFORMATION TABLE

| STATUS OF OWN PROCESS | LOGICAL COMMUNICATION MANAGEMENT IDENTIFIER | OWN CONNECTION IDENTIFIER | PARTNER CONNECTION IDENTIFIER | PHYSICAL COMMUNICATION | OWN COMMUNICATION IDENTIFIER | PARTNER COMMUNICATION IDENTIFIER | RECONNECTION AVAILABILITY | ESTABLISHMENT |
|---|---|---|---|---|---|---|---|---|
| SERVER | C1 | 1 | — | — | 10 | — | — | N |
| CLIENT | C2 | 2 | 1 | P2 | 99 | 10 | Y | N |

PHYSICAL MANAGEMENT INFORMATION TABLE

| PHYSICAL COMMUNICATION MANAGEMENT IDENTIFIER | COMMUNICATION NUMBER | ROUTE INFORMATION | COMMUNICATION STATE |
|---|---|---|---|
| — | — | — | — |
| P2 | 1 | CX | N |

(ST3)

COMMUNICATION MANAGEMENT INFORMATION TABLE

| STATUS OF OWN PROCESS | LOGICAL COMMUNICATION MANAGEMENT IDENTIFIER | OWN CONNECTION IDENTIFIER | PARTNER CONNECTION IDENTIFIER | PHYSICAL COMMUNICATION | OWN COMMUNICATION IDENTIFIER | PARTNER COMMUNICATION IDENTIFIER | RECONNECTION AVAILABILITY | ESTABLISHMENT |
|---|---|---|---|---|---|---|---|---|
| SERVER | C1 | 1 | 2 | P1 | 10 | 99 | Y | N |
| CLIENT | C2 | 2 | 1 | P2 | 99 | 10 | Y | N |

PHYSICAL MANAGEMENT INFORMATION TABLE

| PHYSICAL COMMUNICATION MANAGEMENT IDENTIFIER | COMMUNICATION NUMBER | ROUTE INFORMATION | COMMUNICATION STATE |
|---|---|---|---|
| P1 | 1 | AX | N |
| P2 | 1 | CX | N |

COMMUNICATION MANAGEMENT INFORMATION TABLE

| STATUS OF OWN PROCESS | LOGICAL COMMUNICATION MANAGEMENT IDENTIFIER | OWN CONNECTION IDENTIFIER | PARTNER CONNECTION IDENTIFIER | PHYSICAL COMMUNI-CATION | OWN COMMUNI-CATION IDENTIFIER | PARTNER COMMUNI-CATION IDENTIFIER | RECON-NECTION AVAILA-BILITY | ES-TABLISH-MENT |
|---|---|---|---|---|---|---|---|---|
| SERVER | C1 | 1 | 2 | P1 | 10 | 99 | Y | N |
| CLIENT | C2 | 2 | 1 | P2 | 99 | 10 | Y | Y |

PHYSICAL MANAGEMENT INFORMATION TABLE

| PHYSICAL COMMUNICATION MANAGEMENT IDENTIFIER | LOGICAL COMMUNICATION IDENTIFIER | COMMUNICATION NUMBER | ROUTE INFORMATION | COMMUNICATION STATE |
|---|---|---|---|---|
| P1 | C1 | 1 | AX | N |
| P2 | C2 | 1 | CX | Y |

(ST5)

COMMUNICATION MANAGEMENT INFORMATION TABLE

| STATUS OF OWN PROCESS | LOGICAL COMMUNICATION MANAGEMENT IDENTIFIER | OWN CONNECTION IDENTIFIER | PARTNER CONNECTION IDENTIFIER | PHYSICAL COMMUNI-CATION | OWN COMMUNI-CATION IDENTIFIER | PARTNER COMMUNI-CATION IDENTIFIER | RECON-NECTION AVAILA-BILITY | ES-TABLISH-MENT |
|---|---|---|---|---|---|---|---|---|
| SERVER | C1 | 1 | 2 | P2 | 10 | 99 | Y | Y |
| CLIENT | C2 | 2 | 1 | P2 | 99 | 10 | Y | Y |

PHYSICAL MANAGEMENT INFORMATION TABLE

| PHYSICAL COMMUNICATION MANAGEMENT IDENTIFIER | LOGICAL COMMUNICATION IDENTIFIER | COMMUNICATION NUMBER | ROUTE INFORMATION | COMMUNICATION STATE |
|---|---|---|---|---|
| P1 | C1 | 1 | AX | Y |
| P2 | C2 | 1 | CX | Y |

COMMUNICATION MANAGEMENT INFORMATION TABLE

| STATUS OF OWN PROCESS | LOGICAL COMMUNICATION MANAGEMENT IDENTIFIER | OWN CONNECTION IDENTIFIER | PARTNER CONNECTION IDENTIFIER | PHYSICAL COMMUNICATION | OWN COMMUNICATION IDENTIFIER | PARTNER CONNECTION IDENTIFIER | RECONNECTION AVAILABILITY | ESTABLISHMENT |
|---|---|---|---|---|---|---|---|---|
| SERVER | C1 | 1 | 2 | P1 | 10 | 99 | Y | Y |
| CLIENT | C2 | 2 | 1 | — | 99 | 10 | Y | N |

PHYSICAL MANAGEMENT INFORMATION TABLE

| PHYSICAL COMMUNICATION MANAGEMENT IDENTIFIER | COMMUNICATION NUMBER | ROUTE INFORMATION | COMMUNICATION STATE |
|---|---|---|---|
| P1 | 1 | AX | Y |
| — | — | — | — |

(ST12)

COMMUNICATION MANAGEMENT INFORMATION TABLE

| STATUS OF OWN PROCESS | LOGICAL COMMUNICATION MANAGEMENT IDENTIFIER | OWN CONNECTION IDENTIFIER | PARTNER CONNECTION IDENTIFIER | PHYSICAL COMMUNICATION | OWN COMMUNICATION IDENTIFIER | PARTNER CONNECTION IDENTIFIER | RECONNECTION AVAILABILITY | ESTABLISHMENT |
|---|---|---|---|---|---|---|---|---|
| SERVER | C1 | 1 | 2 | P1 | 10 | 99 | Y | Y |
| CLIENT | C2 | 2 | 1 | P4 | 99 | 10 | Y | N |

PHYSICAL MANAGEMENT INFORMATION TABLE

| PHYSICAL COMMUNICATION MANAGEMENT IDENTIFIER | COMMUNICATION NUMBER | ROUTE INFORMATION | COMMUNICATION STATE |
|---|---|---|---|
| P1 | 1 | AX | Y |
| P4 | 1 | DY | N |

(ST13)

COMMUNICATION MANAGEMENT INFORMATION TABLE

| STATUS OF OWN PROCESS | LOGICAL COMMUNICATION MANAGEMENT IDENTIFIER | OWN CONNECTION IDENTIFIER | PARTNER CONNECTION IDENTIFIER | PHYSICAL COMMUNICATION | OWN COMMUNICATION IDENTIFIER | PARTNER CONNECTION IDENTIFIER | RECONNECTION AVAILABILITY | ESTABLISHMENT |
|---|---|---|---|---|---|---|---|---|
| SERVER | C1 | 1 | 2 | P3 | 10 | 99 | Y | N |
| CLIENT | C2 | 2 | 1 | P4 | 99 | 10 | Y | N |

PHYSICAL MANAGEMENT INFORMATION TABLE

| PHYSICAL COMMUNICATION MANAGEMENT IDENTIFIER | COMMUNICATION NUMBER | ROUTE INFORMATION | COMMUNICATION STATE |
|---|---|---|---|
| P3 | 1 | BY | N |
| P4 | 1 | DY | N |

COMMUNICATION MANAGEMENT INFORMATION TABLE

| STATUS OF OWN PROCESS | LOGICAL COMMUNICATION MANAGEMENT IDENTIFIER | OWN CONNECTION IDENTIFIER | PARTNER CONNECTION IDENTIFIER | PHYSICAL COMMUNICATION | OWN COMMUNICATION IDENTIFIER | PARTNER COMMUNICATION IDENTIFIER | RECONNECTION AVAILABILITY | ESTABLISHMENT |
|---|---|---|---|---|---|---|---|---|
| SERVER | C1 | 1 | 2 | P3 | 10 | 99 | Y | N |
| CLIENT | C2 | 2 | 1 | P4 | 99 | 10 | Y | Y |

| LOGICAL COMMUNICATION IDENTIFIER | COMMUNICATION NUMBER | ROUTE INFORMATION | COMMUNICATION STATE |
|---|---|---|---|
| C1 | 1 | BY | N |
| C2 | 1 | DY | Y |

PHYSICAL MANAGEMENT INFORMATION TABLE

| PHYSICAL COMMUNICATION MANAGEMENT IDENTIFIER |
|---|
| P3 |
| P4 |

(ST15)

COMMUNICATION MANAGEMENT INFORMATION TABLE

| STATUS OF OWN PROCESS | LOGICAL COMMUNICATION MANAGEMENT IDENTIFIER | OWN CONNECTION IDENTIFIER | PARTNER CONNECTION IDENTIFIER | PHYSICAL COMMUNICATION | OWN COMMUNICATION IDENTIFIER | PARTNER COMMUNICATION IDENTIFIER | RECONNECTION AVAILABILITY | ESTABLISHMENT |
|---|---|---|---|---|---|---|---|---|
| SERVER | C1 | 1 | 2 | P3 | 10 | 99 | Y | Y |
| CLIENT | C2 | 2 | 1 | P4 | 99 | 10 | Y | Y |

| LOGICAL COMMUNICATION IDENTIFIER | COMMUNICATION NUMBER | ROUTE INFORMATION | COMMUNICATION STATE |
|---|---|---|---|
| C1 | 1 | BY | Y |
| C2 | 1 | DY | Y |

PHYSICAL MANAGEMENT INFORMATION TABLE

| PHYSICAL COMMUNICATION MANAGEMENT IDENTIFIER |
|---|
| P3 |
| P4 |

COMMUNICATION MANAGEMENT INFORMATION TABLE

| STATUS OF OWN PROCESS | LOGICAL COMMUNICATION MANAGEMENT IDENTIFIER | OWN CONNECTION IDENTIFIER | PARTNER CONNECTION IDENTIFIER | PHYSICAL COMMUNI- CATION | OWN COMMUNI- CATION IDENTIFIER | PARTNER COMMUNI- CATION IDENTIFIER | RECON- NECTION AVAILA- BILITY | ES- TABLISH- MENT |
|---|---|---|---|---|---|---|---|---|
| SERVER | C1 | 1 | 2 | — | 10 | 99 | Y | N |
| CLIENT | C2 | 2 | 1 | P2 | 99 | 10 | Y | Y |

PHYSICAL MANAGEMENT INFORMATION TABLE

| LOGICAL COMMUNICATION IDENTIFIER | COMMUNI- CATION NUMBER | ROUTE INFORMATION | COMMUNI- CATION STATE |
|---|---|---|---|
| — | — | — | — |
| C2 | 1 | CX | Y |

PHYSICAL COMMUNICATION MANAGEMENT IDENTIFIER:
P2

(ST22)

COMMUNICATION MANAGEMENT INFORMATION TABLE

| STATUS OF OWN PROCESS | LOGICAL COMMUNICATION MANAGEMENT IDENTIFIER | OWN CONNECTION IDENTIFIER | PARTNER CONNECTION IDENTIFIER | PHYSICAL COMMUNI- CATION | OWN COMMUNI- CATION IDENTIFIER | PARTNER COMMUNI- CATION IDENTIFIER | RECON- NECTION AVAILA- BILITY | ES- TABLISH- MENT |
|---|---|---|---|---|---|---|---|---|
| SERVER | C1 | 1 | 2 | P3 | 10 | 99 | Y | N |
| CLIENT | C2 | 2 | 1 | P2 | 99 | 10 | Y | Y |

PHYSICAL MANAGEMENT INFORMATION TABLE

| LOGICAL COMMUNICATION IDENTIFIER | COMMUNI- CATION NUMBER | ROUTE INFORMATION | COMMUNI- CATION STATE |
|---|---|---|---|
| C1 | 1 | BY | N |
| C2 | 1 | CX | Y |

PHYSICAL COMMUNICATION MANAGEMENT IDENTIFIER:
P3
P2

(ST23)

COMMUNICATION MANAGEMENT INFORMATION TABLE

| STATUS OF OWN PROCESS | LOGICAL COMMUNICATION MANAGEMENT IDENTIFIER | OWN CONNECTION IDENTIFIER | PARTNER CONNECTION IDENTIFIER | PHYSICAL COMMUNI- CATION | OWN COMMUNI- CATION IDENTIFIER | PARTNER COMMUNI- CATION IDENTIFIER | RECON- NECTION AVAILA- BILITY | ES- TABLISH- MENT |
|---|---|---|---|---|---|---|---|---|
| SERVER | C1 | 1 | 2 | P3 | 10 | 99 | Y | N |
| CLIENT | C2 | 2 | 1 | P4 | 99 | 10 | Y | N |

PHYSICAL MANAGEMENT INFORMATION TABLE

| LOGICAL COMMUNICATION IDENTIFIER | COMMUNI- CATION NUMBER | ROUTE INFORMATION | COMMUNI- CATION STATE |
|---|---|---|---|
| C1 | 1 | BY | N |
| C2 | 1 | DY | N |

PHYSICAL COMMUNICATION MANAGEMENT IDENTIFIER:
P3
P4

COMMUNICATION MANAGEMENT INFORMATION TABLE

| STATUS OF OWN PROCESS | LOGICAL COMMUNICATION MANAGEMENT IDENTIFIER | OWN CONNECTION IDENTIFIER | PARTNER CONNECTION IDENTIFIER | PHYSICAL COMMUNICATION | OWN COMMUNICATION IDENTIFIER | PARTNER COMMUNICATION IDENTIFIER | RECONNECTION AVAILABILITY | ESTABLISHMENT |
|---|---|---|---|---|---|---|---|---|
| SERVER | C1 | 1 | 2 | P3 | 10 | 99 | Y | Y |
| CLIENT | C2 | 2 | 1 | P4 | 99 | 10 | Y | N |

PHYSICAL MANAGEMENT INFORMATION TABLE

| PHYSICAL COMMUNICATION MANAGEMENT IDENTIFIER | COMMUNICATION NUMBER | ROUTE INFORMATION | COMMUNICATION STATE |
|---|---|---|---|
| P3 | 1 | BY | Y |
| P4 | 1 | DY | N |

(ST25)

COMMUNICATION MANAGEMENT INFORMATION TABLE

| STATUS OF OWN PROCESS | LOGICAL COMMUNICATION MANAGEMENT IDENTIFIER | OWN CONNECTION IDENTIFIER | PARTNER CONNECTION IDENTIFIER | PHYSICAL COMMUNICATION | OWN COMMUNICATION IDENTIFIER | PARTNER COMMUNICATION IDENTIFIER | RECONNECTION AVAILABILITY | ESTABLISHMENT |
|---|---|---|---|---|---|---|---|---|
| SERVER | C1 | 1 | 2 | P3 | 10 | 99 | Y | Y |
| CLIENT | C2 | 2 | 1 | P4 | 99 | 10 | Y | Y |

PHYSICAL MANAGEMENT INFORMATION TABLE

| PHYSICAL COMMUNICATION MANAGEMENT IDENTIFIER | COMMUNICATION NUMBER | ROUTE INFORMATION | COMMUNICATION STATE |
|---|---|---|---|
| P3 | 1 | BY | Y |
| P4 | 1 | DY | Y |

FIG. 25

111 COMMUNICATION MANAGEMENT INFORMATION TABLE

| STATUS OF OWN PROCESS | LOGICAL COMMUNICATION MANAGEMENT IDENTIFIER | OWN CONNECTION IDENTIFIER | PARTNER CONNECTION IDENTIFIER | PHYSICAL COMMUNICATION MANAGEMENT IDENTIFIER | OWN COMMUNICATION IDENTIFIER | PARTNER COMMUNICATION IDENTIFIER | RECONNECTION AVAILABILITY | ESTABLISHMENT |
|---|---|---|---|---|---|---|---|---|
| SERVER | C1 | 1 | 2 | P1<br>P2 | 10 | 18 | Y | Y |

| STATUS OF OWN PROCESS | LOGICAL COMMUNICATION MANAGEMENT IDENTIFIER | OWN CONNECTION IDENTIFIER | PARTNER CONNECTION IDENTIFIER | PHYSICAL COMMUNICATION MANAGEMENT IDENTIFIER | OWN COMMUNICATION IDENTIFIER | PARTNER COMMUNICATION IDENTIFIER | RECONNECTION AVAILABILITY | ESTABLISHMENT |
|---|---|---|---|---|---|---|---|---|
| CLIENT | C2 | 1 | 2 | P3 P4 | 11 | 18 | Y | Y |

211 COMMUNICATION MANAGEMENT INFORMATION TABLE

FIG. 26

113 PHYSICAL MANAGEMENT INFORMATION TABLE

| PHYSICAL COMMUNICATION MANAGEMENT IDENTIFIER | LOGICAL COMMUNICATION MANAGEMENT IDENTIFIER | COMMUNICATION NUMBER | ROUTE INFORMATION | COMMUNICATION STATE |
|---|---|---|---|---|
| P1 | C1 | 1 | AX | Y |
| P2 | C1 | 2 | BY | Y |

FIG. 27

213 PHYSICAL MANAGEMENT INFORMATION TABLE

| PHYSICAL COMMUNICATION MANAGEMENT IDENTIFIER | LOGICAL COMMUNICATION MANAGEMENT IDENTIFIER | COMMUNI- CATION NUMBER | ROUTE INFOR- MATION | COMMUNI- CATION STATE |
|---|---|---|---|---|
| P3 | C2 | 1 | CX | Y |
| P4 | C2 | 2 | DY | Y |

FIG. 28

PROGRAM AND METHOD FOR CONTROLLING COMMUNICATION

This application is a continuing application, filed under 35 U.S.C. §111(a), of International Application PCT/JP2003/002277, filed Feb. 27, 2003.

BACKGROUND OF THE INVENTION

1. Field of the Invention

This invention relates to a communication control program and method for controlling communication between computers and, more particularly, to a communication control program and method for performing communication via some transmission routes.

2. Description of the Related Art

In a LAN (Local Area network) or the like connecting computers, there is only one transmission route between the computers. If a trouble happens in a transmission route connecting computers, communication between the computers is interrupted. Therefore, for high reliable communication, extra communication equipment should be prepared.

For example, two LAN adaptors are installed in a system. One LAN adaptor is used as an operational host and the other is used as a standby host. When the operational host breaks down, the operational host LAN adaptor is made invalid while the standby host LAN adaptor is made valid instead (for example, refer to Japanese Unexamined Patent Publication No. 9-326810). With this technique, even if a trouble happens in one LAN adaptor, the other LAN adaptor can continue the communication.

As another technique, when a communication adaptor is switched to another in a system having some communication adaptors, the other communication adaptor performs multi-address transmission to send an ARP (Address Resolution Protocol) request message (for example, refer to Japanese Unexamined Patent Publication No. 10-320327). When a trouble happens, the communication adaptor can obtain the MAC (Media Access Control) addresses of other devices to establish the communication.

By the way, in many existing networks, when packet transmission is failed, this transmission is repeated until it is done successfully. When the packet transmission is failed a prescribed number of times, a process such as an application recognizes that the connection has been disconnected, and establishes another connection via a different transmission route.

However, a conventional method of switching connections takes time from occurrence of a transmission route trouble until when a process such as an application recognizes disconnection of the connection. This is because the transmission route trouble is not detected until the packet transmission is failed several times. Therefore, communication between processes of different computers is suspended while the packet transmission is repeated. This deteriorates processing efficiency of the network.

Further, even if there are some physically different transmission routes between computers, only part of the routes are different. In the patent references 1 and 2, only LAN adaptors (communication adaptors) are different. Alternatively, some different transmission routes via the same router may be prepared to select an efficient route. However, these cases where only part of the transmission routes is different may be insufficient in reliability for some system uses. In addition, route selection by specifying a device such as a router deprives a degree of freedom in which some routes are simultaneously used.

SUMMARY OF THE INVENTION

This invention has been made in view of foregoing, and intends to provide a communication management program for preventing communication between processes of different computers from being interrupted due to a trouble in one transmission route.

To solve the above problem, this invention provides a communication control program for performing communication with another computer via a plurality of communication devices each having a transmission route. This communication control program causes a computer to execute the process of: selecting at least one communication device from the plurality of communication devices and establishing at least one physical connection via the at least one communication device selected, in response to a connection request from a prescribed process; defining the at least one physical connection established, as a logical connection; establishing a new physical connection via a different communication device from a troubled communication device of a troubled physical connection and including the new physical connection in the logical connection when the troubled physical connection is detected in the logical connection; and performing communication via established physical connections included in the logical connection, in response to a communication request applied to the logical connection when the communication request arrives from the prescribed process.

Further, to solve the above problem, provided is a communication control method for performing communication with another computer via a plurality of communication devices each having a transmission route. This communication control method comprises the steps of: selecting at least one communication device from the plurality of communication devices and establishing at least one physical connection via the at least one communication device selected, in response to a connection request from a prescribed process; defining the at least one physical connection established, as a logical connection; establishing a new physical connection via a different communication device from a troubled communication device of a troubled physical connection and including the new physical connection in the logical connection when the troubled physical connection is detected in the logical connection; and performing communication via established physical connections included in the logical connection, in response to a communication request applied to the logical connection when the communication request arrives from the prescribed process.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 shows an example of the data structure of a communication management information table.

FIG. 8 shows an example of the data structure of a physical management information table.

FIG. 12 shows the first half of state transitions recognized by information tables.

FIG. 13 shows the second half of the state transitions recognized by the information tables.

FIG. 17 shows the first half of state transitions recognized by the information tables.

FIG. 18 shows the second half of the state transitions recognized by the information tables.

FIG. 20 shows the first half of state transitions recognized by the information tables.

FIG. 21 shows the second half of the state transitions recognized by the information tables.

FIG. 25 shows an example of a server communication management information table in communication via some routes.

FIG. 26 shows an example of a client communication management information table in communication via some routes.

FIG. 27 shows an example of a server physical management information table in communication via some routes.

FIG. 28 shows an example of a client physical management information table in communication via some routes.

DESCRIPTION OF THE PREFERRED EMBODIMENTS

One embodiment of this invention will be hereinafter described with reference to the accompanying drawings.

The present invention which is implemented to this embodiment will be first outlined and then the embodiment will be specifically described.

Figure 1:
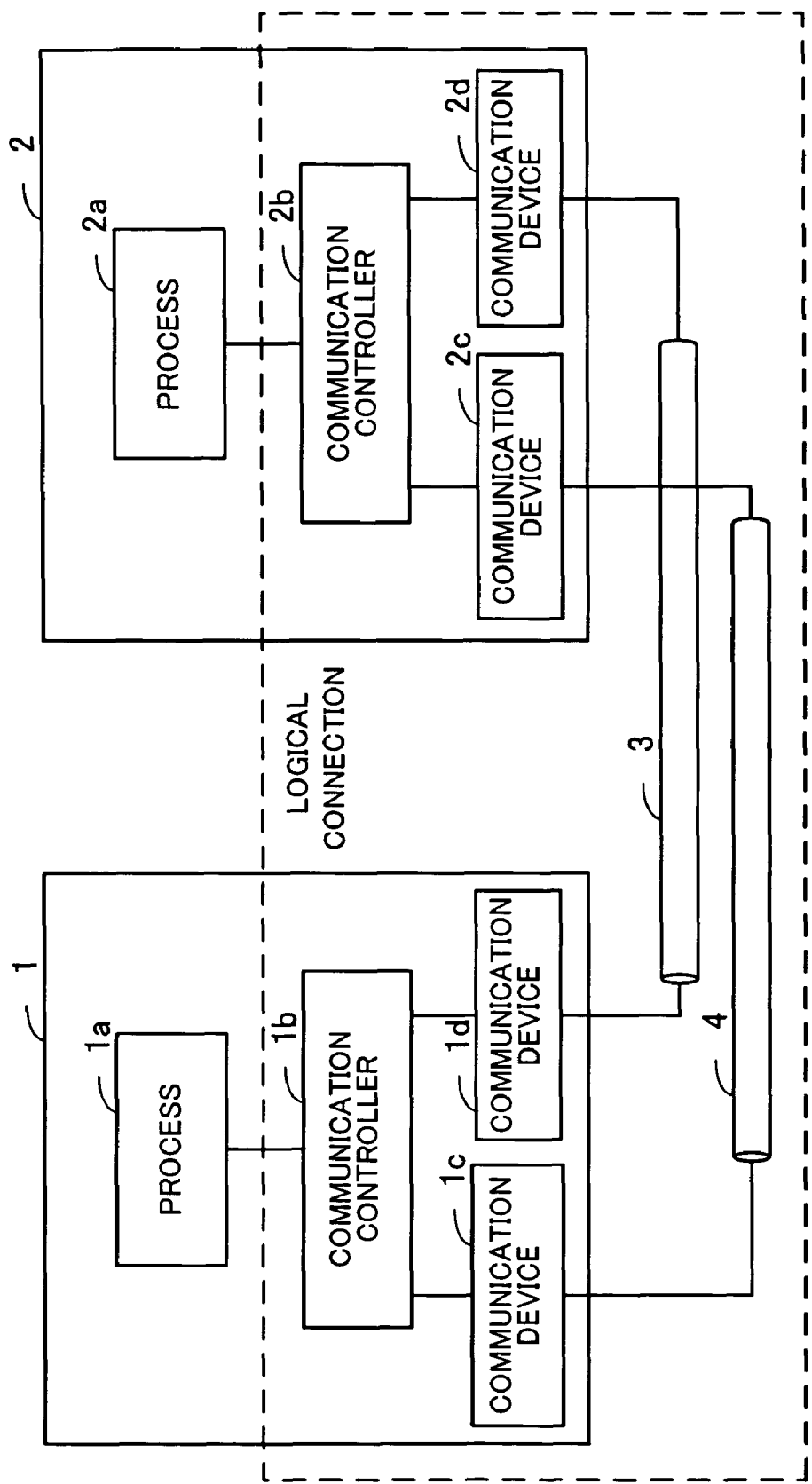
FIG. 1 is a conceptual diagram of this invention which is implemented to this embodiment.

FIG. 1 is a conceptual diagram of this invention which is implemented to this embodiment. This invention is applied to a transmission system in which some transmission routes exist between computers 1 and 2. The computer 1 has some communication devices 1c and 1d. In this computer 1, a communication controller 1b receives communication requests from a process 1a. This communication controller 1b controls the communication devices 1c and 1d to perform communication with the computer 2. Similarly, the computer 2 has some communication devices 2c and 2d. In this computer 2, a communication controller 2b receives communication requests from a process 2a. The communication controller 2b controls the communication devices 2c and 2d to perform communication with the computer 1.

Each of the communication controllers 1b and 2b of the computers 1 and 2 collectively manages physical connections each of which is established via a transmission route 3, 4, in order to virtually use them as one transmission system (logical connection). A notice of this data communication environment including the virtual transmission route (logical connection) is given to the process 1a, 2a which is executed by a user.

Specifically, in response to a connection request from the process, the communication controller 1b selects one or more communication devices 1c, 1d and establishes physical connections via the selected communication devices. Then the communication controller 1b defines the one or more established physical connections as a logical connection. When a trouble happens in a physical connection included in the logical connection, the communication controller 1b establishes another physical connection via a communication device which is different from that of the troubled physical connection, and includes this connection in the logical connection. When the communication controller 1b receives a communication request applied to the logical connection, from the process, it performs communication via the physical connections included in the logical connection, for the communication request.

As described above, physical transmission routes 3 and 4 to be included in a virtual transmission route (logical connection) can be dynamically selected depending on system operating conditions. As a result, communication reliability can be enhanced. For example, simultaneous use of some usable transmission routes 3 and 4 can improve transmission efficiency.

In this invention, each connection can be managed by using the connection identifiers (for example, IP addresses) of computers 1 and 2, the name of a used device in a computer 1, route information specifying a route, the communication identifiers (for example, TCP port numbers) of applications which communicate with each other, and a communication number specifying a physical connection. For example, a logical connection can be recognized based on the connection identifiers and communication identifiers of the computers 1 and 2. Physical communication is recognized based on the communication number in addition to them. That is, logical communication is a set of a plurality of physical communication. It should be noted that the physical communication may be recognized by, not the processes 1a and 2a, but only by the communication controllers 1b and 2b.

As is clear from the above, there are two connection forms for communication: logical (external) connection and physical (internal) connection. The logical connection form (logical connection) is a set of physical connections that allows a plurality of transmission routes 3 and 4 to be desirably used. The externality of the logical connection means that the connection is recognized by the processes 1a and 2a positioned outside a communication management function. The physical connection form is a physical connection comprising an arbitrary communication device and a transmission route connected to the communication device. The internality of the physical connection means that existence of the connection is hidden from the processes 1a and 2a positioned outside the communication management function.

The process 1a, 2a, which requests for communication in such system, starts the communication by specifying a partner connection identifier and own and partner communication identifiers. At this time, the communication controller 1b, 2b automatically selects a suitable communication device and transmission route based on the operating conditions of communication devices and establishes a physical connection. Therefore, reliability and performance can be surely improved without changing system usage. In addition, devices can be exchanged or added without interrupting user's operation.

When a trouble happens in a communication device or a transmission route, a usable device and route are automatically detected and a reconnection request is made with the same communication number, thereby resuming the communication. At this time, the processes 1a and 2a can keep on the communication without perceiving the transmission route trouble because they recognize their communication based on whether a logical connection is alive. Therefore, reliability of communication service to processes which are executed by user applications is improved.

Further, by using a plurality of communication numbers, a plurality of routes can be automatically selected to make simultaneous connections. This simultaneous communication via the plurality of routes can make a communication speed between the processes 1a and 2a faster. Even if a trouble happens in one transmission route, the communication between the processes 1a and 2a is not interrupted while the other physical connections via different transmission routes are alive, resulting in enhancing reliability.

Furthermore, in a situation where a plurality of physical connections are established, reconnection can be made every time when one physical connection is disconnected or when all physical connections are disconnected.

Figure 2:
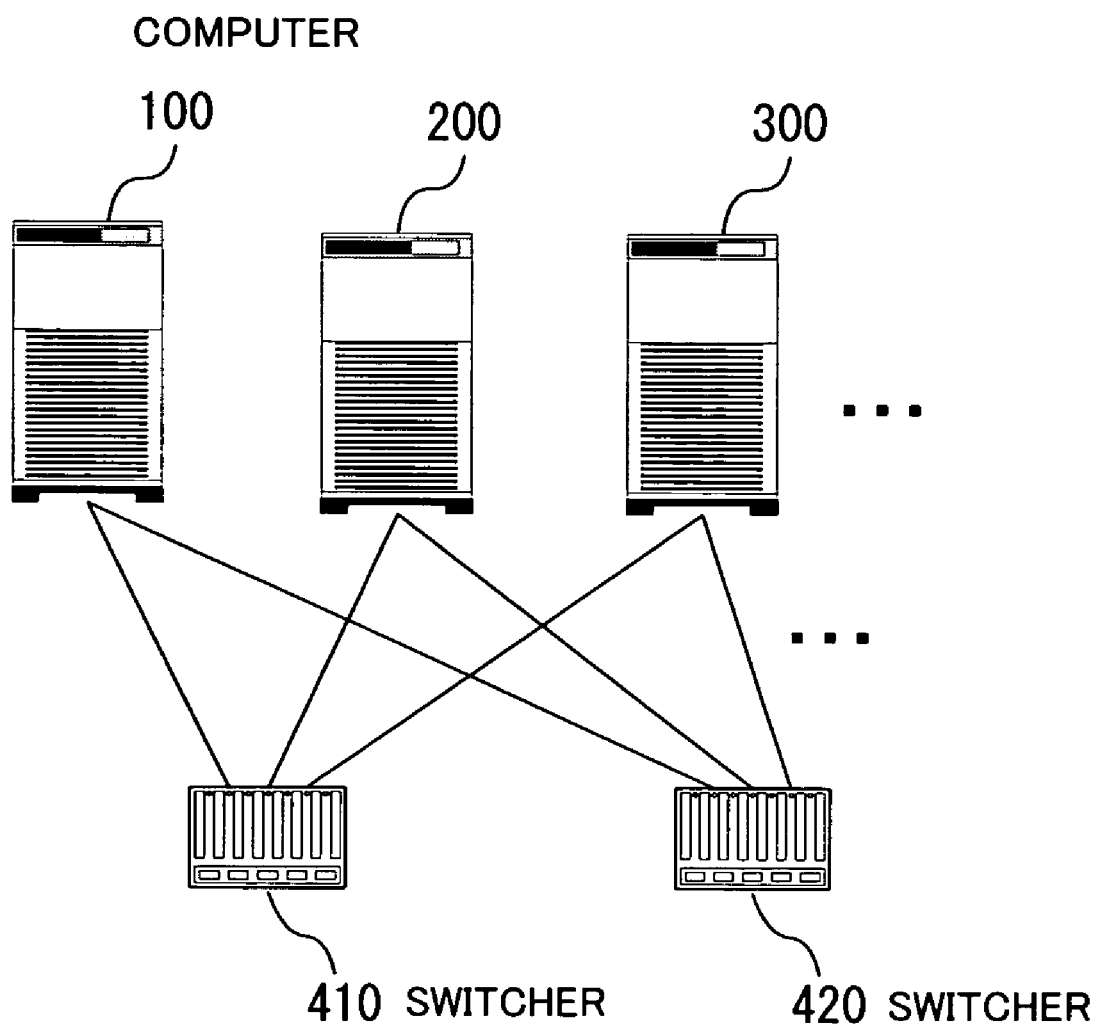
FIG. 2 shows an example of the system configuration of this embodiment.

FIG. 2 shows an example of the system configuration of this embodiment. Referring to FIG. 2, a plurality of computers 100, 200, 300, . . . are connected to each other via two switchers 410 and 420. Therefore, there are two transmission routes between the computers: a transmission route via the switcher 410 and a transmission route via the switcher 420.

Figure 3:
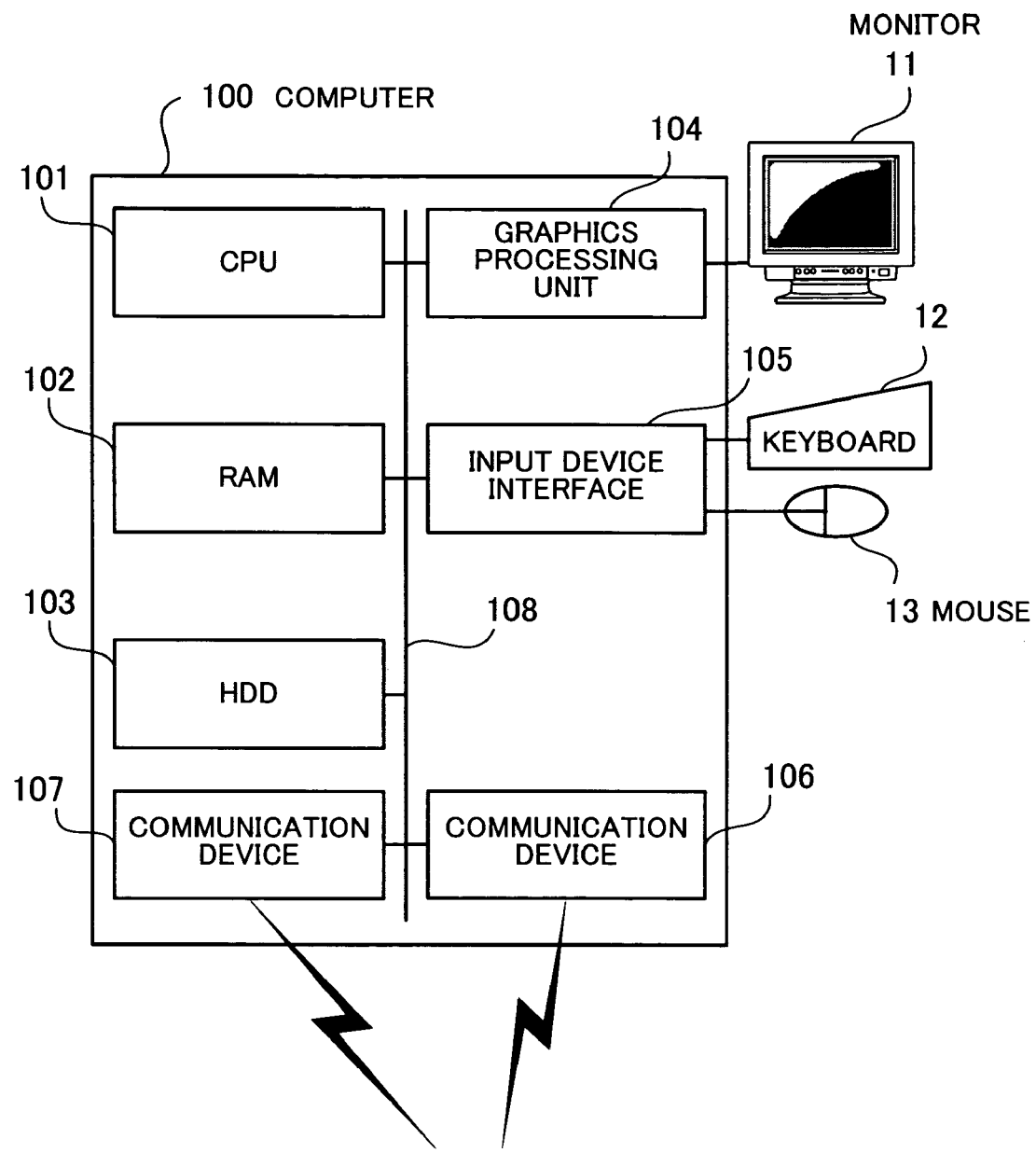
FIG. 3 shows an example of the hardware configuration of a computer.

FIG. 3 shows an example of the hardware configuration of a computer. The computer 100 is entirely controlled by a CPU (Central Processing Unit) 101. The CPU 101 is connected to a RAM (Random Access Memory) 102, an HDD (Hard Disk Drive) 103, a graphics processing unit 104, an input device interface 105, and communication devices 106 and 107 via a bus 108.

The RAM 102 temporarily stores at least part of OS (Operating System) program and application programs which the CPU 101 runs. In addition, the RAM 102 stores various kinds of data which are required for CPU processing. The HDD 103 stores the OS and application programs.

The graphics processing unit 104 is connected to a monitor 11. The graphics processing unit 104 displays images on the monitor 11 under the control of the CPU 101. The input device interface 105 is connected to a keyboard 12 and a mouse 13. The input device interface 105 transfers signals from the keyboard 12 and the mouse 13 to the CPU 101 via the bus 108.

The communication device 106 is connected to the switcher 410. The communication device 106 communicates data with other computers via the switcher 410.

The communication device 107 is connected to the switcher 420. The communication device 107 communicates data with other computers via the switcher 420.

With the above hardware configuration, the processing functions of this embodiment can be realized. FIG. 3 shows an example of the hardware configuration of the computer 100 and the other computers 200 and 300 can have the same hardware configuration.

The functions required for this embodiment in a system having the above hardware configuration will be described with reference to a connection between the computers 100 and 200.

Figure 4:
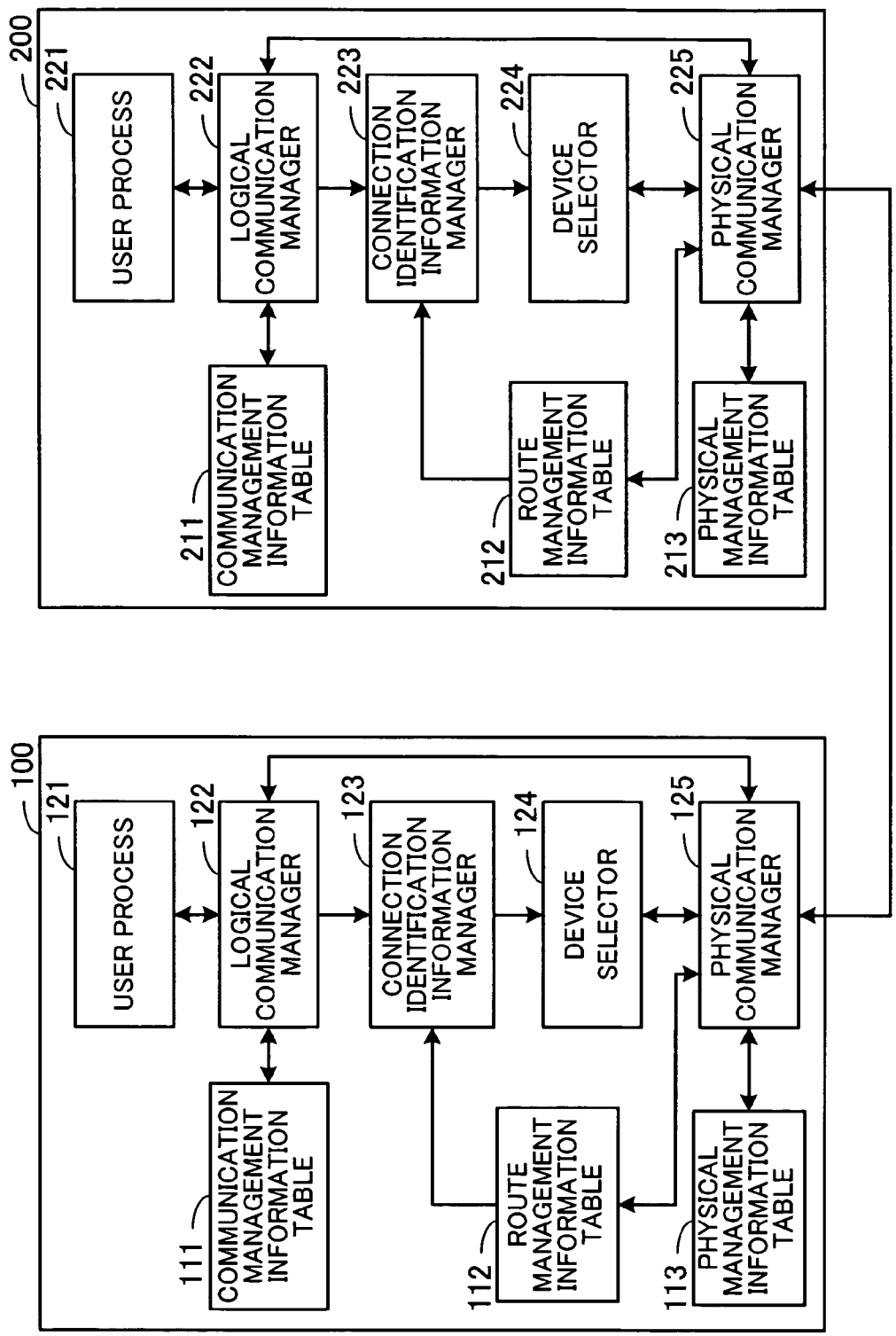
FIG. 4 is a functional block diagram of computers.

FIG. 4 is a functional block diagram of the computers. The computer 100 is provided with a communication management information table 111, a route management information table 112, a physical management information table 113, a user process 121, a logical communication manager 122, a connection identification information manager 123, a device selector 124, and a physical communication manager 125.

The communication management information table 111 manages information on logical communication routes (logical connections) which is provided to the user process 121.

The route management information table 112 manages transmission routes (communication devices and transmission routes) to communication partners.

The physical management information table 113 manages the states of connections (physical connections) which are established on physical transmission routes.

The user process 121 executes processes based on the application programs. For communication with another computer, the user process 121 operates as a server or as a client. The user process 121 functioning as a client sends a communication start request in response to an input command requesting for a process including communication with a server. This communication start request includes partner connection identifier/own communication identifier/partner communication identifier.

When the logical communication manager 122 receives the communication start request from the user process 121, it creates the communication management information table 111. The logical communication manager 122 recognizes a logical connection in a tree structure (communication management tree) based on the communication management information table 111. When the logical communication manager 122 creates the communication management information table 111, it updates the communication management tree. Then the contents of the communication start request are sent to the connection identification information manager 123.

The connection identification information manager 123 recognizes physical connections in a tree structure (state management tree) based on the route management information table 112 to determine whether identifiers are effective and which devices are usable. The connection identification information manager 123 gives the determination result to the device selector 124.

The device selector 124 determines which device and route are to be used, based on a load status with the round robin method or the like. When the device selector 124 selects a route to be used, it sends a request for establishing communication, to the physical communication manager 125 being connected with the selected route.

The physical communication manager 125 creates the route management information table 112 in response to the communication start request from the device selector 124 and tries to establish a connection. When the connection is failed, the device selector 124 continues this process to reselect a device to be used. Then the physical communication manager 125 retries a connection by using the reselected device.

Similarly to the computer 100, the computer 200 is provided with a communication management information table 211, a route management information table 212, a physical management information table 213, a user process 221, a logical communication manager 222, a connection identification information manager 223, a device selector 224, and a physical communication manager 225. The constituent elements function in the same way as those of the computer 100.

A relation between communication identification information and connection identification information will be now described.

Figure 5:
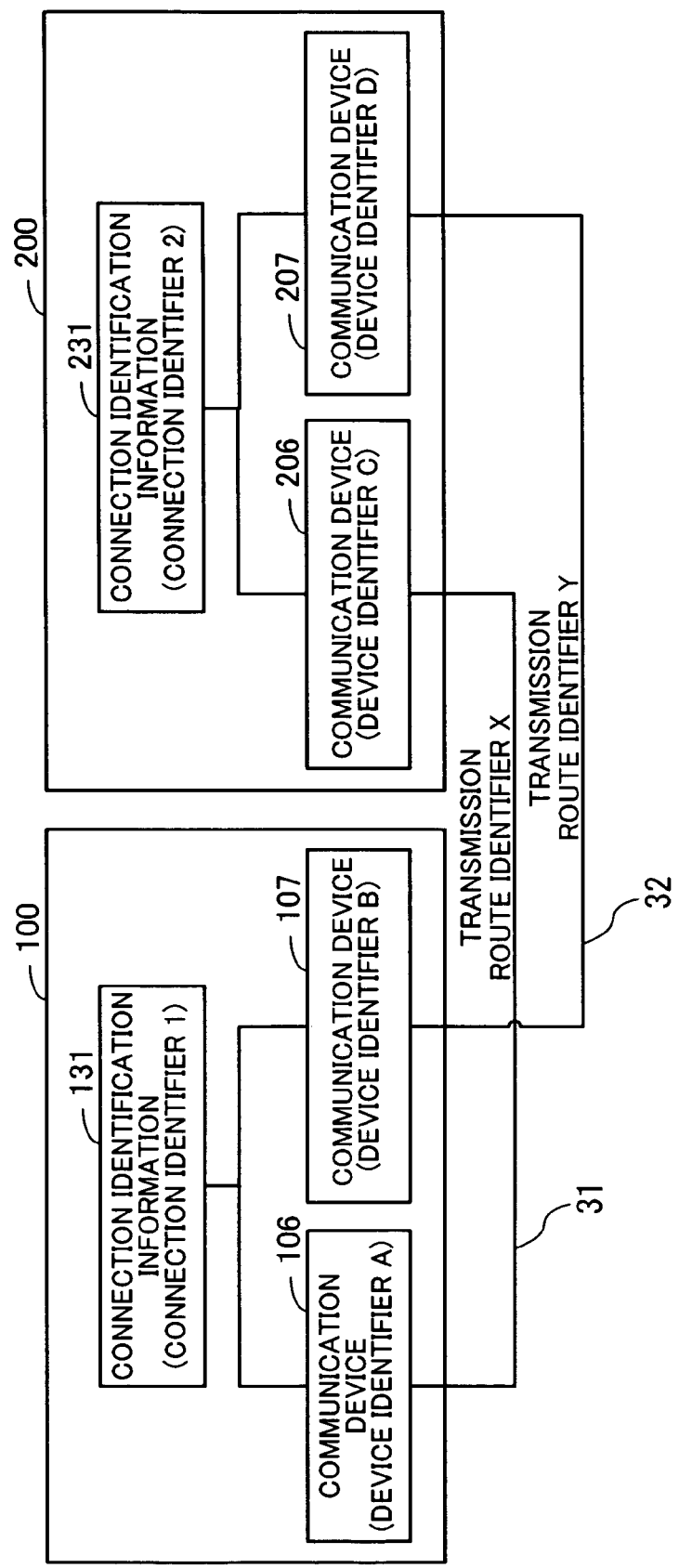
FIG. 5 is a conceptual diagram of connections of this embodiment.

FIG. 5 is a conceptual diagram of connections in this embodiment. As shown in FIG. 5, the computer 100 selects a communication device 106, 107 to be used for communication, based on connection identification information 131. Similarly, the computer 200 selects a communication device 206, 207 to be used for communication, based on connection identification information 231.

The connection identifiers of the computers 100 and 200 are taken as "1" and "2," respectively. In addition, the identifiers of the communication devices 106 and 107 of the computer 100 are taken as "A" and "B," respectively. The identifiers of the communication devices 206 and 207 of the computer 200 are taken as "C" and "D," respectively.

The communication devices 106 and 206 are connected to each other via a transmission route 31 of which the identifier is taken as "X." In addition, the communication devices 107 and 207 are connected to each other via a transmission route 32 of which the identifier is taken as "Y."

Such relation about connections is recognized by both of the computers 100 and 200 and is registered in each information table.

FIG. 6 shows an example of the data structure of the communication management information table. The communication management information table 111 is created for each logical connection and each communication management information table is given a communication identifier. The communication management information table 111 has columns for status of own process, logical communication management identifier, own connection identifier, partner connection identifier, physical communication, own communication identifier, partner communication identifier, reconnection availability, and establishment. Information arranged in a row is associated with each other.

The status of own process column shows whether a user process of the own computer performing communication is a server or a client. The logical communication management identifier column shows identification information identifying a logical connection, which is recognized by the process. The own connection identifier column shows the identification information (for example, IP address) of the own computer on the network. The partner connection identifier column shows the identification information of a partner computer on the network. The physical communication column shows the identification information of a transmission route to be used for the communication. The own communication identifier column shows the identification information of the user process which performs the communication. The partner communication identifier column shows the identification information of the user process which is the communication partner. The reconnection availability column shows whether reconnection can be made or not. "Y" in this reconnection availability column indicates reconnectable. The establishment column shows whether a physical connection has been established. In this FIG. 6, "Y" in this establishment column indicates that a physical connection has been established.

Figure 7:
FIG. 7 shows an example of the data structure of a route management information table.

FIG. 7 shows an example of the data structure of the route management information table. The route management information table 112 has columns for route identifier, partner connection identifier, used device, route, number of using lines, and usability. Information arranged in a row is associated with each other.

The route identifier column shows the identification information (combination of the identification information of a communication device and the identification information of a transmission route) of a communication route. The partner connection identifier column shows the connection identifier (for example, IP address) of a communication partner computer. The used device column shows the identification information of a communication device. The route column shows the identification information of the transmission route. The number of using lines column shows the number of lines (physical connections) which uses this communication route for communication. The usability column shows whether this communication route is usable. In this FIG. 7, usable is represented by "Y" while unusable is represented by "N."

FIG. 8 shows an example of the data structure of the physical management information table. The physical management information table 113 has columns for physical communication management identifier, logical communication management identifier, communication number, route information and communication state. Information arranged in a row is associated with each other.

The physical communication management identifier column shows identification information specifying a physical connection. The logical communication management identifier column shows identification information specifying a logical connection to which this physical connection belongs. The communication number column shows the serial number of this physical communication in the same logical connection. The route information column shows the identification information of a transmission route to be used for the communication. The communication state column shows information showing a communication state. In this FIG. 8, communicable is represented by a communication state "Y" while incommunicable is represented by a communication state "N."

The state management tree and the communication management tree are created based on such structured data.

Figure 9:
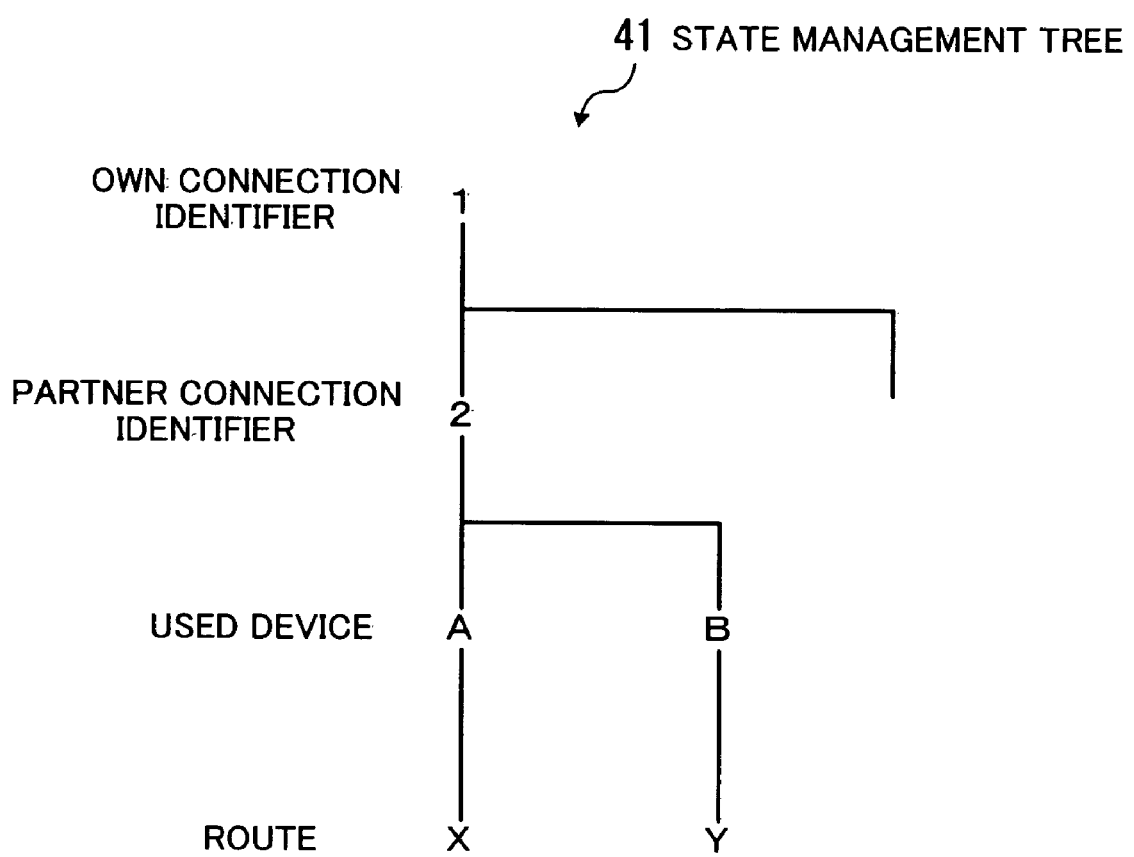
FIG. 9 shows an example of a state management tree.

FIG. 9 shows an example of the state management tree. In the state management tree 41, the connection identifier "1" (own connection identifier) of the computer 100 is set as the root. Beneath the own connection identifier, the connection identifier "2" (partner connection identifier) of the communication partner computer 200 is set. Beneath the partner connection identifier, the identifiers "A" and "B" of the used devices (communication devices 106 and 107) are set. Beneath the used devices, the identifiers "X" and "Y" of the routes (transmission routes 31 and 32) connected to the used devices are set.

Figure 10:
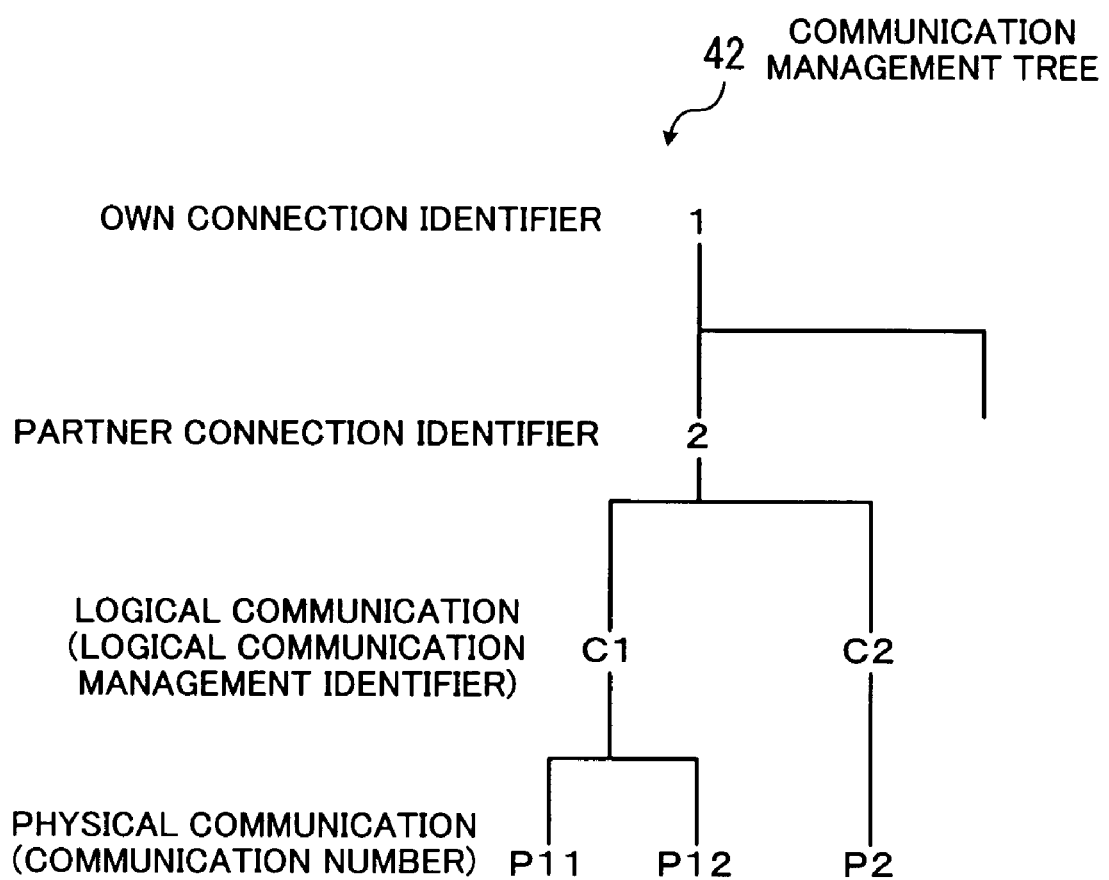
FIG. 10 shows an example of a communication management tree.

FIG. 10 shows an example of the communication management tree. In the communication management tree 42, the connection identifier "1" (own connection identifier) of the computer 100 is set as the root. Beneath the own connection identifier, the connection identifier "2" (partner connection identifier) of the communication partner computer 200 is set. Beneath the partner connection identifier, logical communication management identifiers "C1" and "C2" which are identification information on logical connections are set.

Beneath the logical connections, communication numbers "P11," "P12," and "P2" which are the physical communication identifiers are set.

With the above system, the following process is executed. When the user process 121 sends a communication start request (including a partner connection identifier, an own communication identifier, and a partner communication identifier), the logical communication manager 122 creates the communication management information table 111. Since the communication management information table 111 for the communication start request is created, the communication management tree which is recognized by the logical communication manager 122 is updated. Then the communication start request is given to the connection identification information manager 123 to establish this connection.

The connection identification information manager 123 recognizes the state management tree from the route management information table 112. Then the connection identification information manager 123 determines whether there is a transmission route to a computer with the partner connection identifier and which communication device is used for communication via the transmission route. The connection identification information manager 123 sends the determination result to the device selector 124.

The device selector 124 detects the load statuses (for example, the number of using lines) of the communication devices which are usable for communication with the computer specified by the partner connection identifier, and determines a communication device to be used, with the round robin method. The information on the communication device to be used is sent to the physical communication manager 125.

The physical communication manager 125 creates the management information tables and tries to establish this connection. Specifically, when the physical communication manager 125 sends a connection request to the computer 200 and receives a reply of connection permission, it establishes the connection. When the connection is failed, the device selector 124 continues this process. The device selector 124 selects another communication device and notifies the physical communication manager 125 of this selection. The physical communication manager 125 retries to make a connection based on the given communication information. When this connection can be established successfully, the physical communication manager 125 updates the route management information table 112 and the physical management information table 113. Then the logical communication manager 122 is notified of this establishment of the physical connection and updates the communication management information table 111.

In the communication partner computer 200, the physical communication manager 225 receives the connection request from the physical communication manager 125 and notifies the logical communication manager 222 of this request. Then the logical communication manager 222, the connection identification information manager 223, and the device selector 224 operate to select a communication device to be used and update the communication management information table 211, the route management information table 212, and the physical management information table 213, in the same way as when the user process 211 outputs a connection start request. In a case where the connection request is met, the physical communication manager 225 sends a reply of connection permission. Then when an establishment declaration is given from the computer 100, the physical communication manager 225 establishes this physical connection. The logical communication manager 222 is notified of this establishment of the physical connection and updates the communication management information table 211.

Thereby the user process 121 and the user process 221 of the computer 200 start communication.

It should be noted that the physical communication manager 125 is able to establish some physical connections via different transmission routes for one logical connection. In this case, the physical communication manager 125 assigns each physical connection a communication number from 1. To establish a physical connection to be used instead of a troubled physical connection, the physical communication manager 125 sends a reconnection request via another transmission route by using the same communication number. When the new physical connection is established, communication can resume with the same communication number as before the trouble.

In this connection, each communicating computer is designed to be able to receive connection requests including the own communication identifier even after a connection is established. Generally, when a process operates as a server, it can receive connection requests from a client. When a process operates a client, on the other hand, a server function (at least to receive connection requests) is previously activated.

While normal communication is performed after a connection is established, the logical communication manager 122 directly sends requests to the physical communication manager 125. The physical communication manager 125 gives data to the physical communication manager 225 of the computer 200. The physical communication manager 225 gives the received data to the logical communication manager 222. The logical communication manager 222 gives the data to the user process 221.

When a trouble happens while communication is performed, one or both of the physical communication managers 125 and 225 detect the trouble. For example, communication devices using the InfiniBand architecture can detect troubles in transmission routes and notify higher-ranked controllers (physical communication manager 125, 225).

When the physical communication manager 125 detects a trouble, it requests the device selector 124 to reselect a communication device to be used. Then, the physical communication manager 125 reestablishes this communication via the communication device selected by the device selector 124. In this connection, the same communication number is used for the troubled physical connection and the new physical connection.

The physical communication manager 225 receiving the connection request for reconnection gives this request to the logical communication manager 222. The logical communication manager 222 determines whether this request is a reconnection request, based on whether the same connection identifiers/communication identifiers/communication number exists in the communication management information table 211. The determination result is given to the connection identification information manager 223. In a case of a reconnection request, the connection identification information manager 223 deletes the existing connection identification information on the physical connection from the physical management information table 213 and accepts the reconnection request.

Such a case may occur that both computers 100 and 200 detect a trouble. In this case, a first arriving reconnection request has priority. If reconnection requests are made at the same time (before reconnection is completed), a request from one of a client and a server (the function of a user process) has priority. In a case where reconnection requests from a server have priority, for example, the server computer discards reconnection requests from a client computer. Alternatively, a request from one (normally, client) which first sends a connection request may have priority.

After a connection is reestablished, communication requests which have not been processed before the establishment are automatically made with the new physical connection. As a result, the user processes do not necessarily recognize the communication trouble and the reestablishment.

In a case where some routes are simultaneously used for one logical connection, each established connection is assigned a communication number. In this case, a plurality of physical communication are considered as being under the logical connection, and simultaneous communication is performed by sharing loads with a division rule of the logical communication managers 122 and 222.

Similarly to the normal case, when a trouble happens while some routes are simultaneously used, another connection is reestablished via a communication device reselected by the device selector 124 and with the same communication number.

The process of this embodiment will be now described in detail.

Figure 11:
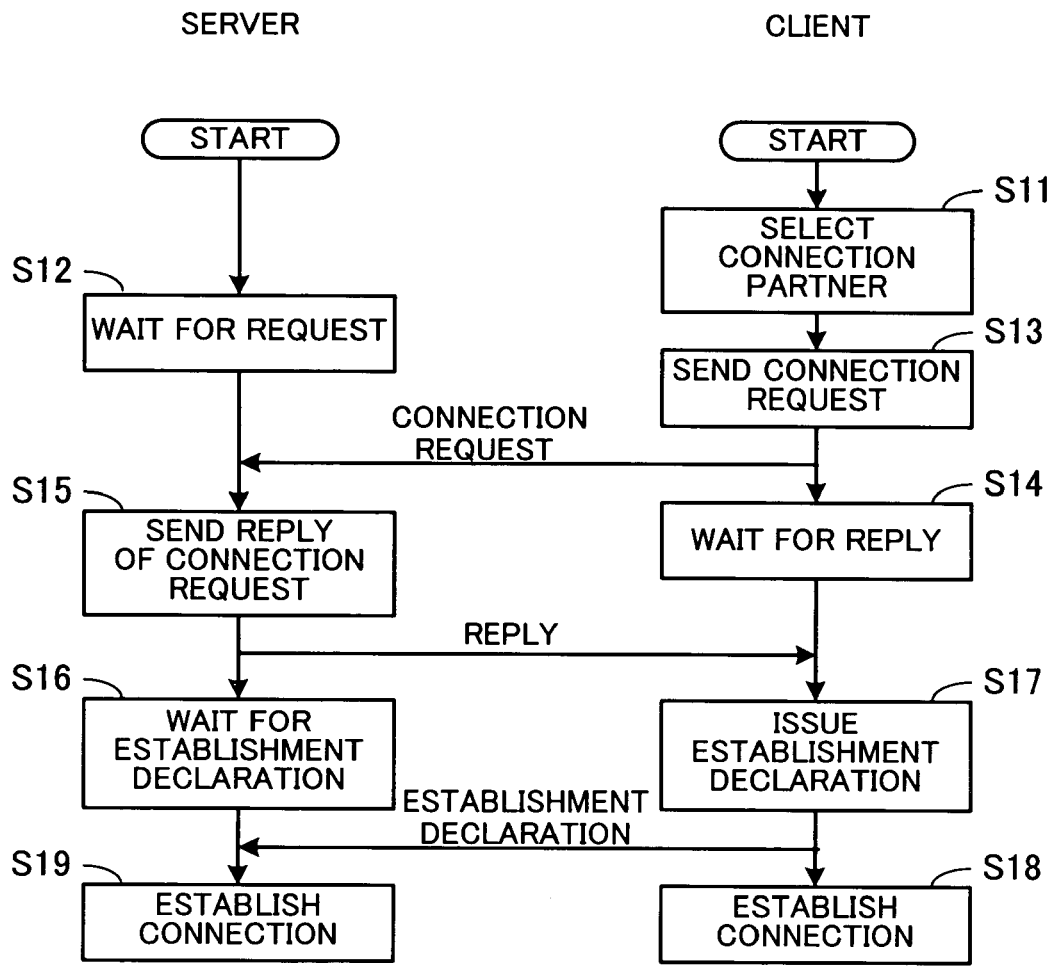
FIG. 11 is a sequence diagram for establishing a connection.

FIG. 11 is a sequence diagram showing a procedure of establishing a connection. FIG. 11 shows the server process on the left side and the client process on the right side. A flow of normally establishing a connection will be described with the user process 121 of the computer 100 as a server and the user process 221 of the computer 200 as a client.

First the client computer 200 selects a connection partner in response to a communication start request from the user process 221 (step S11). The communication start request includes a partner connection identifier, an own communication identifier, and a partner communication identifier in order to specify the communication partner. It is now considered that the computer 100 is selected as the connection partner. At this time, the server computer 100 is in standby mode for receiving a connection request (step S12).

The computer 200 sends a connection request to the computer 100 (step S13). Then the computer 200 enters standby mode for receiving a reply (step S14).

When receiving the connection request, the computer 100 sends a reply of a connection request (step S15). Then the computer 100 enters standby mode for receiving an establishment declaration (step S16).

The computer 200 receiving the reply of the connection request issues an establishment declaration (step S17). Thereby the computer 200 has an established connection (step S18). The computer 100 receiving the establishment declaration also has the established connection (step S19).

A connection is established with the above procedure. State transitions recognized by the communication management information tables and the physical management information tables while a connection is established will be now described with reference to FIGS. 12 and 13. The communication management information tables and the physical management information tables of FIGS. 12 and 13 show server information in the upper row and client information in the lower row.

FIG. 12 shows the first half of the state transitions recognized by the information tables.

The first state (ST1) is a state before connection establishment starts. Before the connection establishment, the server communication management information table 111 shows status of own process "server," logical communication management identifier "C1," own connection identifier "1," partner connection identifier "-", physical communication "--" own communication identifier "10," partner communication identifier "--," reconnection availability "-," and establishment "N." "-" represents that no information is registered. The establishment "N" represents that a connection has not been established.

On the other hand, the client communication management information table 211 shows status of own process "client," logical communication management identifier "C2," own connection identifier "2," partner connection identifier "1," physical communication "--," own communication identifier "99," partner communication identifier "10," reconnection availability "Y," and establishment "N." "-" represents that no information is registered. The establishment "N" represents that a connection has not been established.

It should be noted that, in the client communication management information table 211, the partner connection identifier and the partner communication identifier specified by a communication start request are registered. At this time, no information is registered in the physical management information tables 113 and 213.

The second state (ST2) is a state after the client selects a connection partner (step S11). When the client computer 200 selects the connection partner, physical communication "P2" is set in the client communication management information table 211.

At this time, in the client physical management information table 213, physical communication management identifier "P2," logical communication management identifier "C2," communication number "1," route information "CX," and communication state "N" are set.

The third state (ST3) is a state after the server sends a reply of a connection request (step S15). When the server computer 100 sends the reply of the connection request, partner connection identifier "2," partner communication identifier "99," and reconnection availability "Y" are set in the server communication management information table 111.

At this time, in the server physical management information table 113, physical communication management identifier "P1," logical communication management identifier "C1," communication number "1," route information "AX," and communication state "N" are set.

FIG. 13 shows the second half of the state transitions recognized by the information tables.

The fourth state (ST4) is a state after the client issues an establishment declaration (step S17). When the client computer 200 issues the establishment declaration, establishment "Y" is set in the client communication management information table 211. The establishment "Y" is a flag indicating that a connection has been established. At this time, the communication state column in the client physical management information table 213 is changed to "Y" (indicating a communicable state).

The fifth state (ST5) is a state after a connection is established (step S19). When the server computer 100 receives the establishment declaration, establishment "Y" is set in the communication management information table 111. At this time, the communication state column of the server physical management information table 113 is changed to "Y."

As described above, a physical connection is established and information on the logical connection and physical connection are registered in the communication management information tables and the physical management information tables of the server and client.

A server computer process and client computer process for establishing a connection will be now described in detail.

Figure 14:
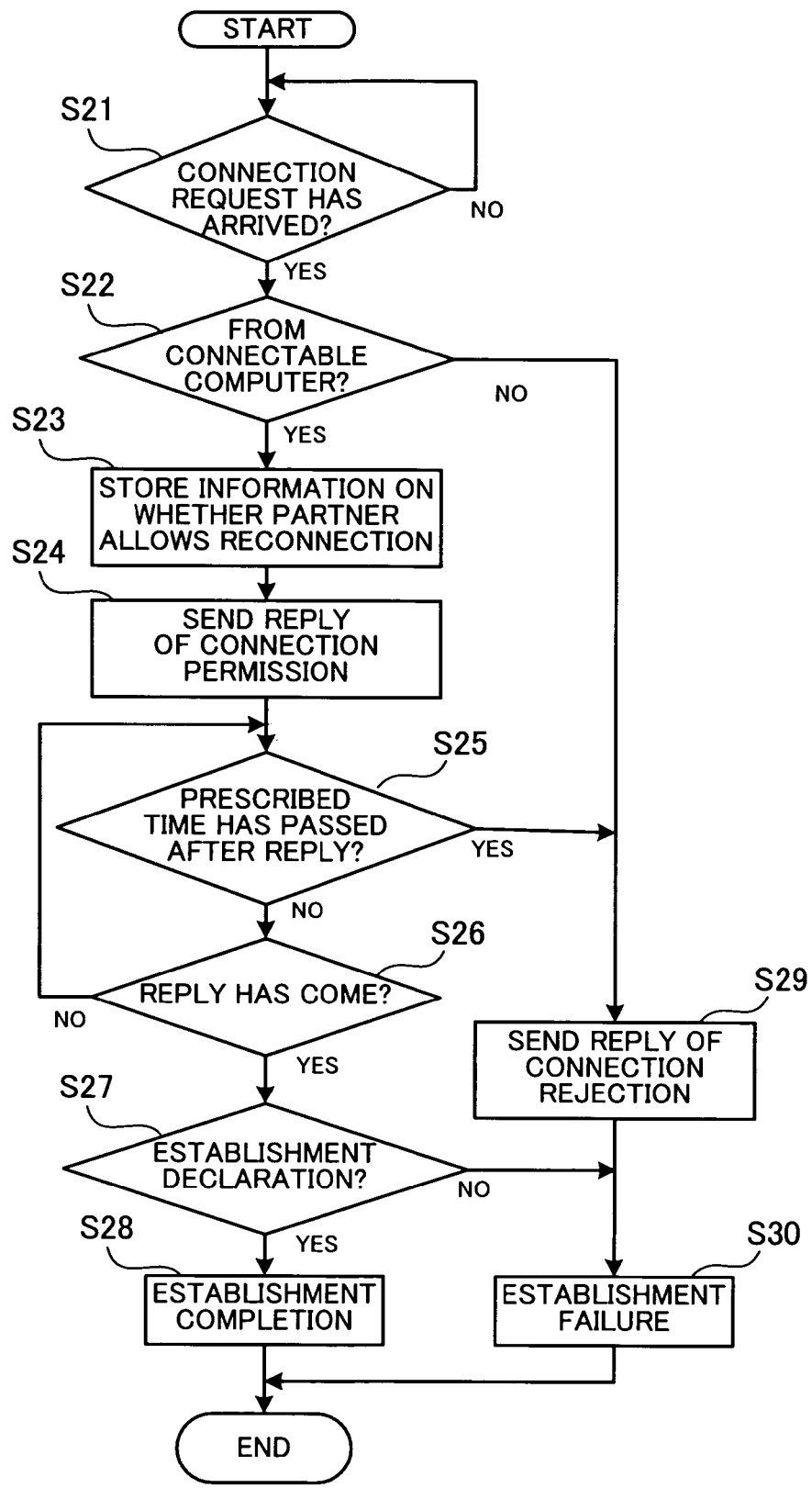
FIG. 14 is a flowchart showing a server process for connection establishment.

FIG. 14 is a flowchart showing a server's connection establishment process. This process of FIG. 14 will be described following step numbers.

(Step 21) The server computer 100 determines whether a connection request has arrived. When yes, this process goes on to step S22. When no, this step S21 is repeated until a connection request arrives.

(Step S22) The computer 100 determines whether the received connection request is from a connectable computer. When yes, this process goes on to step S23. When no, the process goes on to step S29.

(Step S23) The computer 100 stores information indicating whether the connection partner allows reconnection. This information on whether reconnection is allowed is detected from, for example, a connection request. For this process, the client computer 200 sends a connection request together with the information indicating whether to allow reconnection.

(Step S24) The computer 100 sends a reply of connection permission to the client computer 200.

(Step S25) The computer 100 determines whether a prescribed time has passed after the replay was sent in step S24. When yes, this process goes on to step S29. When no, the process goes on to step S26.

(Step S26) The computer 100 determines whether a reply has arrived from the client computer 200. When yes, this process goes on to step S27. When no, the process returns back to step S25 to determine whether a prescribed time has passed.

(Step S27) The computer 100 determines whether the received reply is an establishment declaration. When yes, this process goes on to step S28. When no (for example, a notification of connection rejection), the process goes on to step S30.

(Step S28) The computer 100 establishes this connection and ends this process.

(Step S29) Since the connection request is from an unconnectable computer or since the computer 100 does not receive a reply from the client computer 200 for a prescribed time after sending the reply of connection permission, the computer 100 sends a reply of connection rejection to the computer 200.

(Step S30) Since the computer 100 sent the reply of connection rejection or since the computer 100 received a reply other than an establishment declaration in step S27, it decides a connection failure and ends this process.

Figure 15:
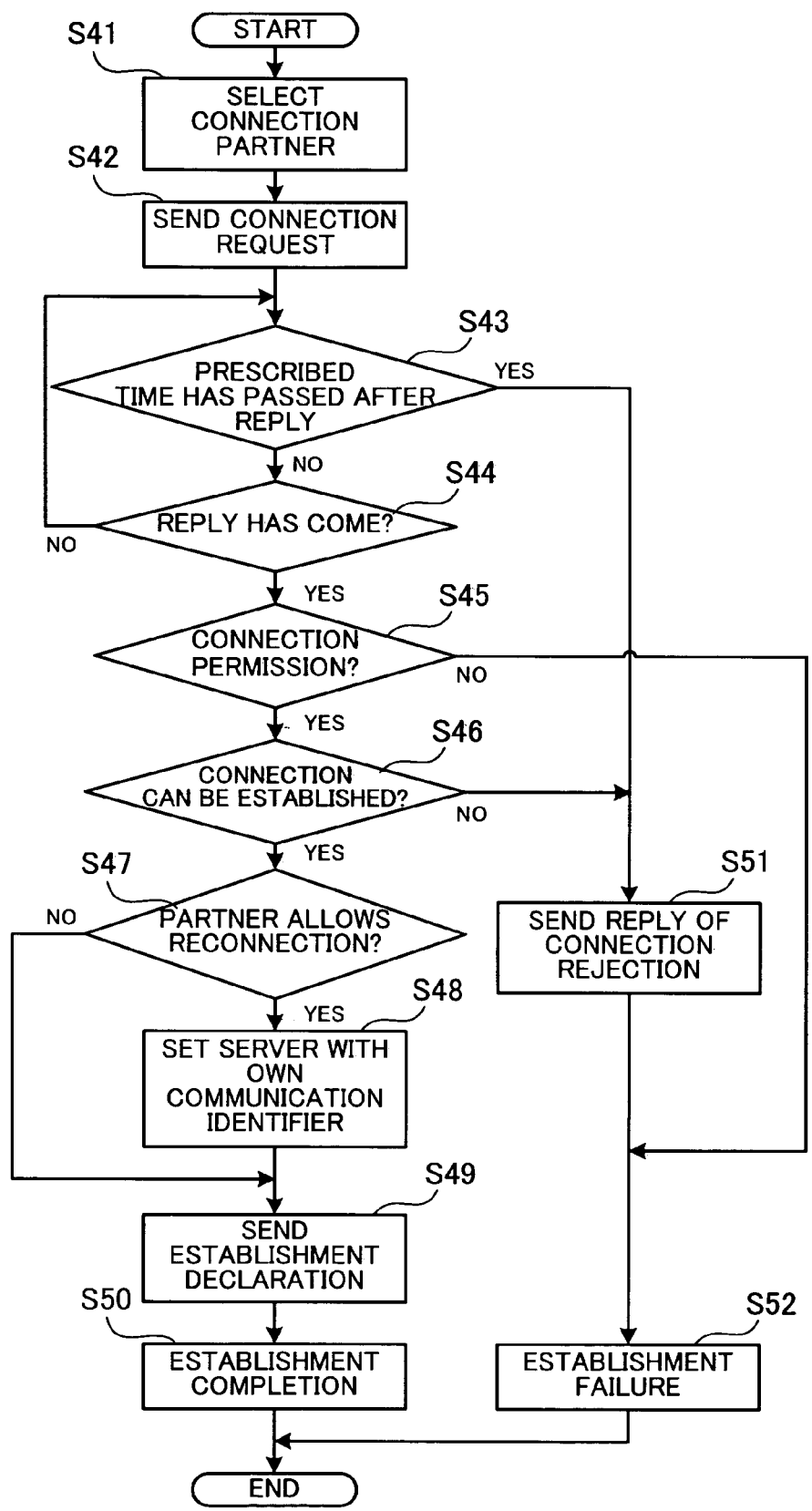
FIG. 15 is a flowchart showing a client process for the connection establishment.

FIG. 15 is a flowchart showing a client's connection establishment process. This process of FIG. 14 will be described following step numbers.

(Step S41) The client computer 200 selects a connection partner.

(Step S42) The computer 200 sends a connection request to the connection partner computer 100.

(Step S43) The computer 200 determines whether a prescribed time has passed after sending the connection request. When yes, this process goes on to step S51. When no, the process goes on to step S44.

(Step S44) The computer 200 determines whether a reply has come from the server computer 100. When yes, this process goes on to step S45. When no, the process returns back to step S43.

(Step S45) The computer 200 determines whether the received reply indicates connection permission. When yes, this process goes on to step S46. When no, the process goes on to step S52.

(Step S46) The computer 200 determines whether this connection can be established. When yes, this process goes on to step S47. When no, the process goes on to step S51.

(Step S47) The computer 200 determines whether the partner computer 100 allows reconnection. When yes, this process goes on to step S48. When no, the process goes on to step S49.

(Step S48) The computer 200 sets a server with the own communication identifier.

(Step S49) The computer 200 sends a reply of establishment declaration to the computer 100.

(Step S50) The computer 200 establishes this connection and ends this process.

(Step S51) Since the computer 200 does not receive a reply for a prescribed time after sending the connection request or since the computer 200 determined in step S46 that this connection could not be established, it sends a reply of connection rejection to the computer 100.

(Step S52) Since the computer 200 sent the reply of connection rejection or since the computer 200 received the reply of connection rejection in step S45, it decides a connection failure and ends this process.

A procedure to be performed when a client detects a connection trouble will be now described in detail.

Figure 16:
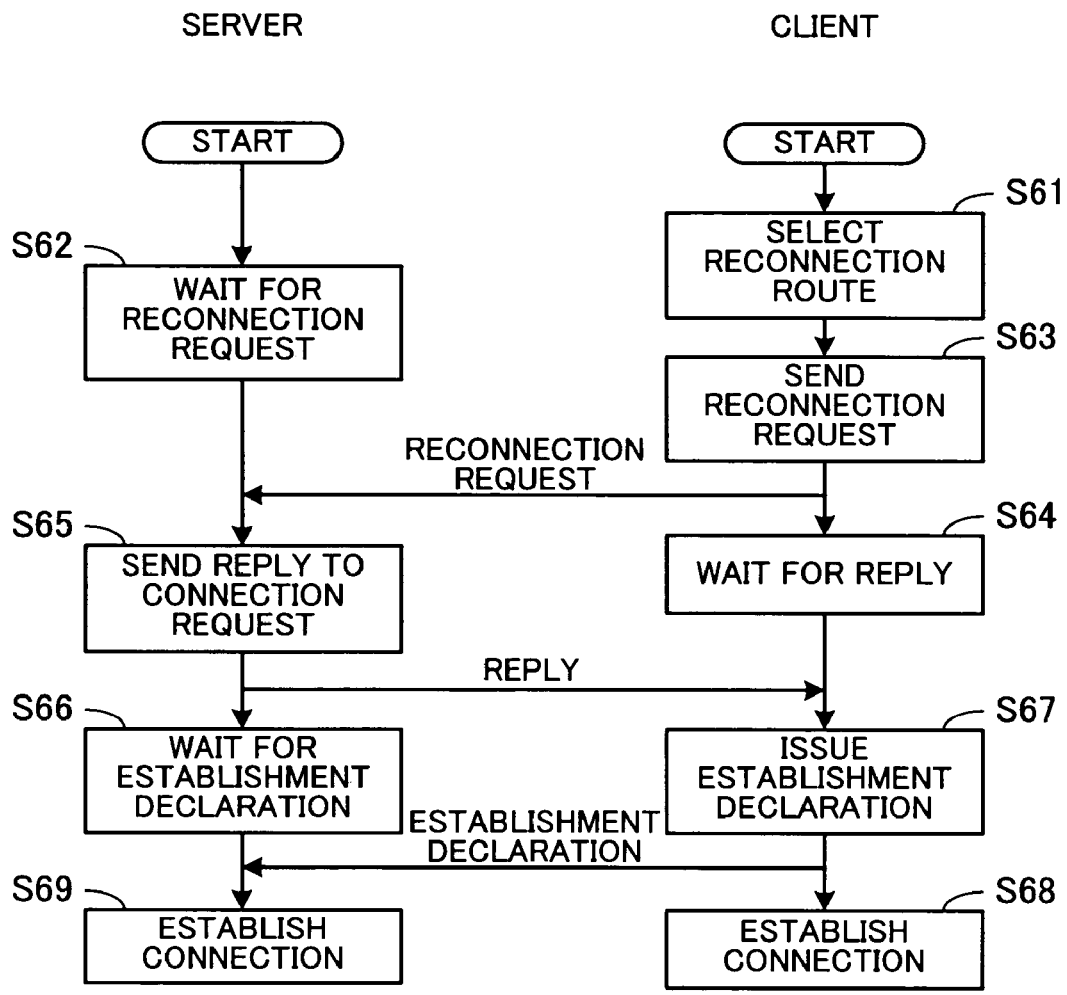
FIG. 16 is a sequence diagram showing a procedure for a case where a client computer detects a connection failure.

FIG. 16 is a sequence diagram showing a procedure for a case where a client computer detects a connection trouble. FIG. 16 shows a server process on the left side and a client process on the right side. A flow of normally reestablishing a connection will be described with the user process 121 of the computer 100 as a server and the user process 221 of the computer 200 as a client.

First the client computer 200 detects a trouble in a physical connection and selects a reconnection route (step S61). Thereby the computer 100 is selected as a reconnection partner. At this time, the server computer 100 is in standby mode for receiving a reconnection request (step S62).

The computer 200 sends a reconnection request to the computer 100 (step S63). Then the computer 200 enters standby mode for receiving a reply (step S64).

The computer 100 receiving the reconnection request sends a reply to the reconnection request (step S65). Then the computer 100 enters standby mode for receiving an establishment declaration (step S66).

The computer 200 receiving the reply to the reconnection request issues an establishment declaration (step S67). Thereby the computer 200 has an established connection (step S68). The computer 100 receiving the establishment declaration also has the established connection (step S69).

With the above procedure, a connection is reestablished. The state transitions recognized by the communication management information tables and the physical management information tables in a case where the client detects a trouble and sends a reconnection request will be now described with reference to FIGS. 17 and 18. The communication management information tables and the physical management information tables of FIGS. 17 and 18 show server information in the upper row and client information in the lower row.

FIG. 17 shows the first half of the state transitions recognized by the information tables.

The first state (ST11) is a state after the client detects a trouble. Before a connection is reestablished, registered in the server communication management information table 111 are status of own process "server," logical communication management identifier "C1," own connection identifier "1," partner connection identifier "2," physical communication "P1," own communication identifier "10," partner communication identifier "99," reconnection availability "Y," and establishment "Y."

On the other hand, registered in the client communication management information table 211 are status of own process "client," logical communication management identifier "C2," own connection identifier "2," partner connection identifier "1," physical communication "--," own communication identifier "99," partner communication identifier "10," reconnection availability "Y," and establishment "N."

It should be noted that the partner identifier and the partner communication identifier specified by a communication start request are registered in the client communication management information table 211. At this time, registered in the server physical management information table 113 are physical communication management identifier "P1," logical communication management identifier "C1," communication number "1," route information "AX," and communication state "Y." In the client physical management information table 213, no information is registered.

The second state (ST12) is a state after the client selects a reconnection route (step S61) and sends a reconnection request (step S63). When the client computer 200 sends the reconnection request, physical communication "P4" is set in the client communication management information table 211.

At this time, physical communication management identifier "P4," logical communication management identifier "C2," communication number "1," route information "DX," and communication state "N" are set in the client physical management information table 213.

The third state (ST13) is a state after the server sends a reply to the reconnection request (step S65). The server computer 100 recognizes the trouble because of the reception of the reconnection request, so that the establishment column of the communication management information table 111 is changed to "N." At this time, the communication state column of the server physical management information table 113 is changed to "N."

FIG. 18 shows the second half of the state transitions recognized by the information tables.

The fourth state (ST14) is a state after the client issues an establishment declaration (step S67). When the client computer 200 issues the establishment declaration, the establishment column of the client communication management information table 211 is changed to "Y." In addition, the communication state column of the client physical management information table 213 is changed to "Y."

The fifth state (ST15) is a state after a connection is established (step S69). When the server computer 100 receives the establishment declaration, the establishment column of the physical management information table 111 is changed to "Y." At this time, the communication state column of the server physical management information table 113 is changed to "Y."

As described above, reconnection is automatically made by using a transmission route different from a troubled transmission route, in response to a reconnection request from a client.

A procedure for a case where a server detects a trouble and sends a reconnection request will be now described in detail.

Figure 19:
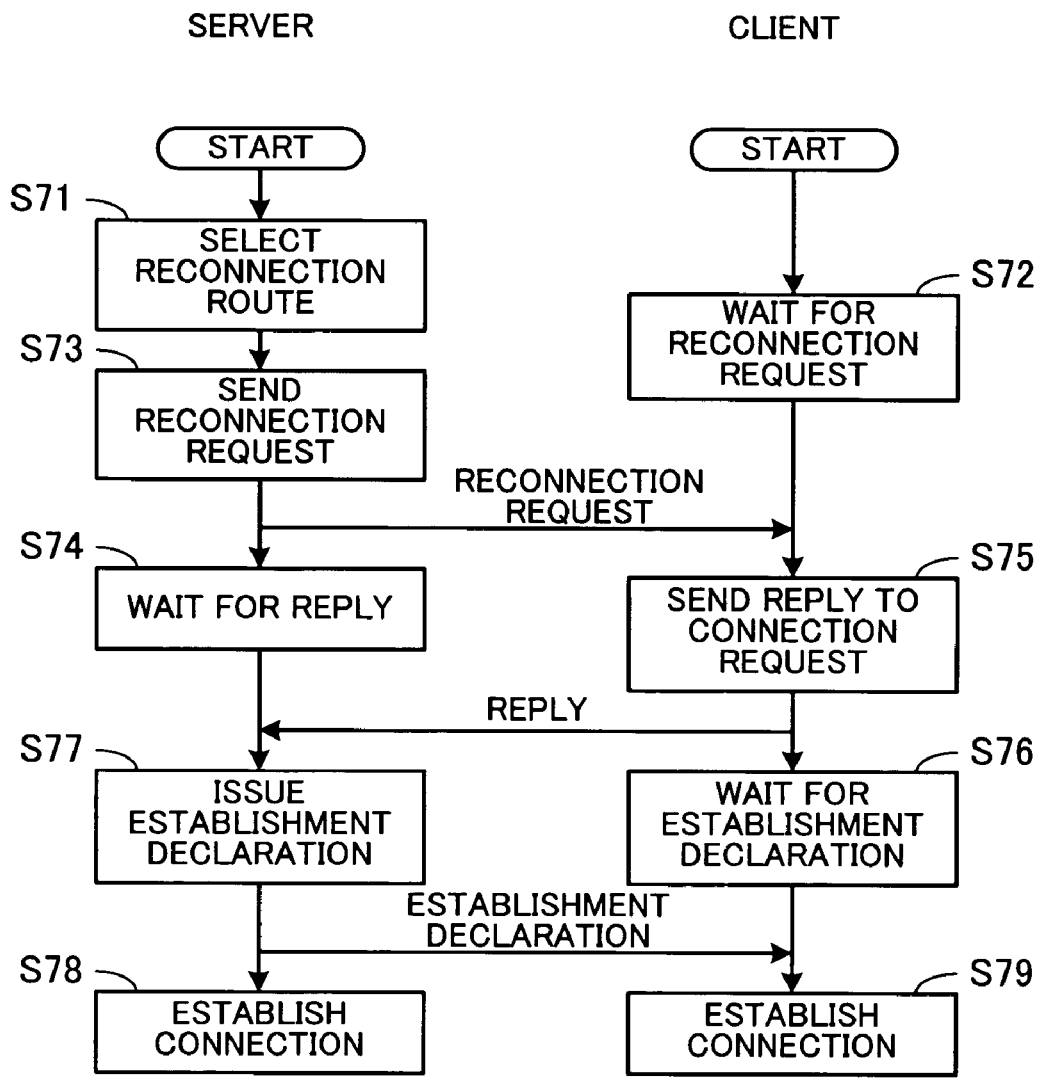
FIG. 19 is a sequence diagram showing a procedure for a case where a server computer detects a connection failure.

FIG. 19 is a sequence diagram showing a procedure for a case where a server computer detects a connection trouble. FIG. 19 shows a server process on the left side and a client process on the right side. A flow of normally reestablishing a connection will be described with the user process 121 of the computer 100 as a server and the user process 221 of the computer 200 as a client.

First the server computer 100 detects a trouble in a physical connection and selects a reconnection route (step S71). Thereby the computer 200 is selected as a reconnection partner. At this time, the client computer 200 is in standby mode for receiving a reconnection request (step S72).

The computer 100 sends a reconnection request to the computer 200 (step S73). Then the computer 100 enters standby mode for receiving a reply (step S74).

The computer 200 receiving the reconnection request sends a reply to the reconnection request (step S75). Then the computer 200 enters standby mode for receiving an establishment declaration (step S76).

The computer 100 receiving the reply to the reconnection request issues an establishment declaration (step S77). Thereby the computer 100 has an established connection (step S78). In addition, the computer 200 receiving the establishment declaration also has the established connection (step S79).

As described above, a connection is reestablished. The state transitions recognized by the communication management information tables and the physical management information tables in a case where the server detects a trouble and sends a reconnection request will be described with reference to FIGS. 20 and 21. The communication management information tables and the physical management information tables of FIGS. 20 and 21 show server information in the upper row and client information in the lower row.

FIG. 20 is the first half of the state transitions recognized by the information tables.

The first state (ST21) is a state after the server detects a trouble. Before a connection is reestablished, registered in the server communication management information table 111 are status of own process "server," logical communication management identifier "C1," own connection identifier "1," partner connection identifier "2," physical communication "--," own communication identifier "10," partner communication identifier "99," reconnection availability "Y," and establishment "N."

On the other hand, registered in the client communication management information table 211 are status of own process "client," logical communication management identifier "C2," own connection identifier "2," partner connection identifier "1," physical communication "P2," own communication identifier "99," partner communication identifier "10," reconnection availability "Y," and establishment "Y."

At this time, registered in the client physical management information table 213 are physical communication management identifier "P2," logical communication management identifier "C2," communication number "1," route information "CX," and communication state "Y." Registered in the server physical management information table 113 is no information.

The second state (ST22) is a state after the server selects a reconnection route (step S71) and sends a reconnection request (step S73). When the server computer 100 sends the connection request, physical communication "P3" is set in the server communication management information table 111.

At this time, physical communication management identifier "P3," logical communication management identifier "C1," communication number "1," route information "BY," and communication state "N" are set in the server physical management information table 113.

The third state (ST23) is a state after the client sends a reply to the reconnection request (step S75). When the client computer 200 recognizes the trouble because of the reception of the reconnection request, the establishment column of the communication management information table 211 is changed to "N." At this time, the communication state column of the client physical management information table 213 is changed to "N."

FIG. 21 is the second half of the state transitions recognized by the information tables.

The fourth state (ST24) is a state after the server issues an establishment declaration (step S77). When the server computer 100 issues the establishment declaration, the establishment column of the server communication management information table 111 is changed to "Y." In addition, the communication state of the server physical management information table 113 is changed to "Y."

The fifth state (ST25) is a state after the connection is established (step S79). When the client computer 200 receives the establishment declaration, the establishment column of the communication management information table 211 is changed to "Y." At this time, the communication state column of the client physical management information table 213 is changed to "Y."

As described above, reconnection is automatically made via a transmission route different from a troubled transmission route, in response to a reconnection request from the server.

The computer process to cope with a connection trouble will be now described.

Figure 22:
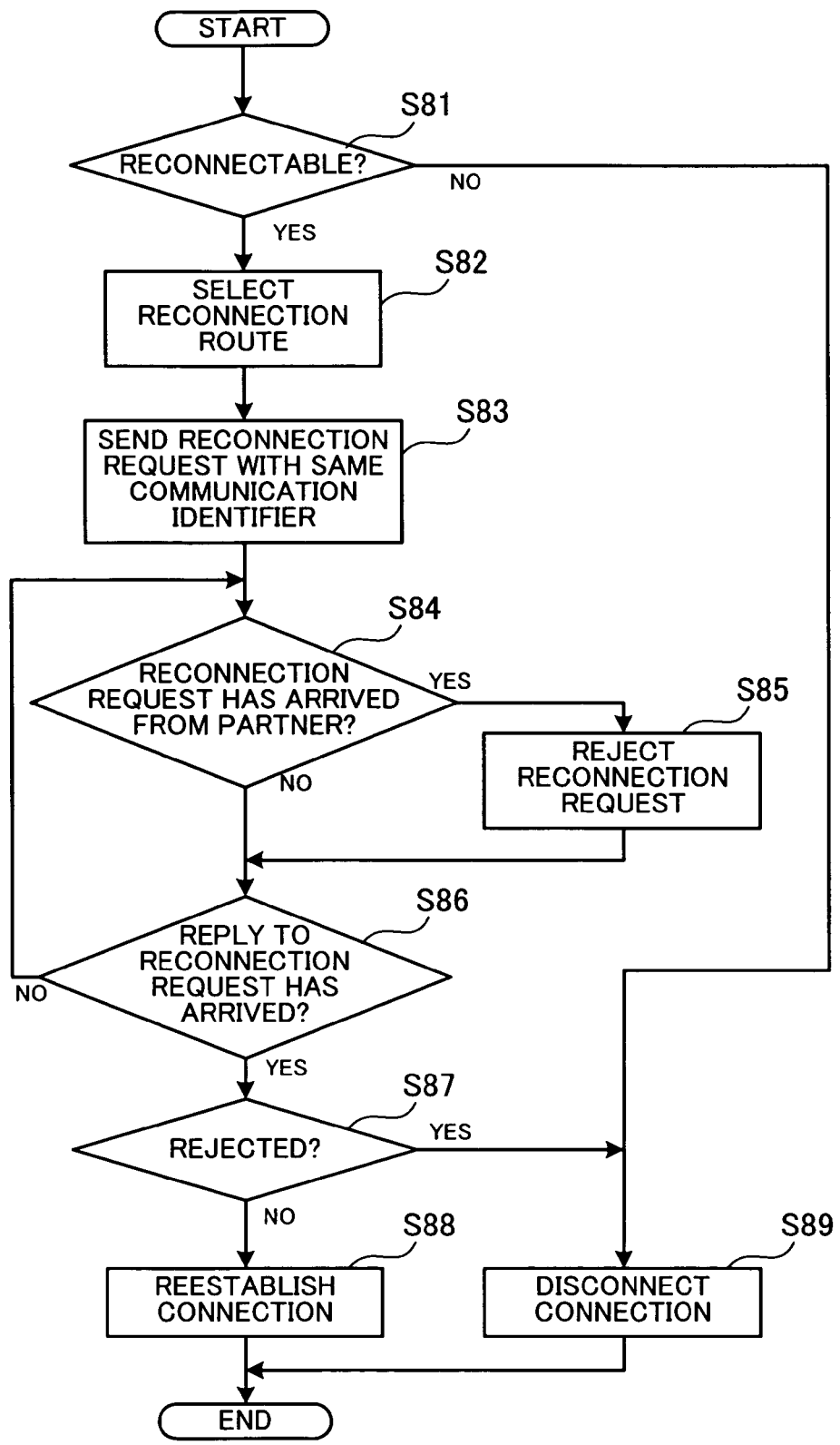
FIG. 22 is a flowchart showing a server computer process to be performed when detecting a connection failure.

FIG. 22 is a flowchart showing how a server computer operates when detecting a connection trouble. This process of FIG. 22 will be described following step numbers.

(Step S81) The server computer 100 which detected a trouble in a physical connection determines whether reconnection to the client computer 200 can be made. When yes, this process goes on to step S82. When no, the process goes on to step S89.

(Step S82) The computer 100 selects a reconnection route.

(Step S83) The computer 100 sends a reconnection request by using the same communication identifier which was used for the troubled physical connection.

(Step S84) The computer 100 determines whether a reconnection request has arrived from the partner (client computer 200). When yes, this process goes on to step S85. When no, the process goes on to step S86.

(Step S85) The computer 100 rejects the reconnection request sent from the client computer 200.

(Step S86) The computer 100 determines whether a reply to the reconnection request has come. When yes, this process goes on to step S87. When no, the process returns back to step S84.

(Step S87) The computer 100 determines whether the reply to the reconnection request is a notification of reconnection rejection. When yes, this process goes on to step S89. When no, the process goes on to step S88.

(Step S88) The computer 100 reestablishes a connection (physical connection) by using the communication route selected in step S82 and ends this process.

(Step S89) The computer 100 decides to disconnect the connection and ends this process.

Figure 23:
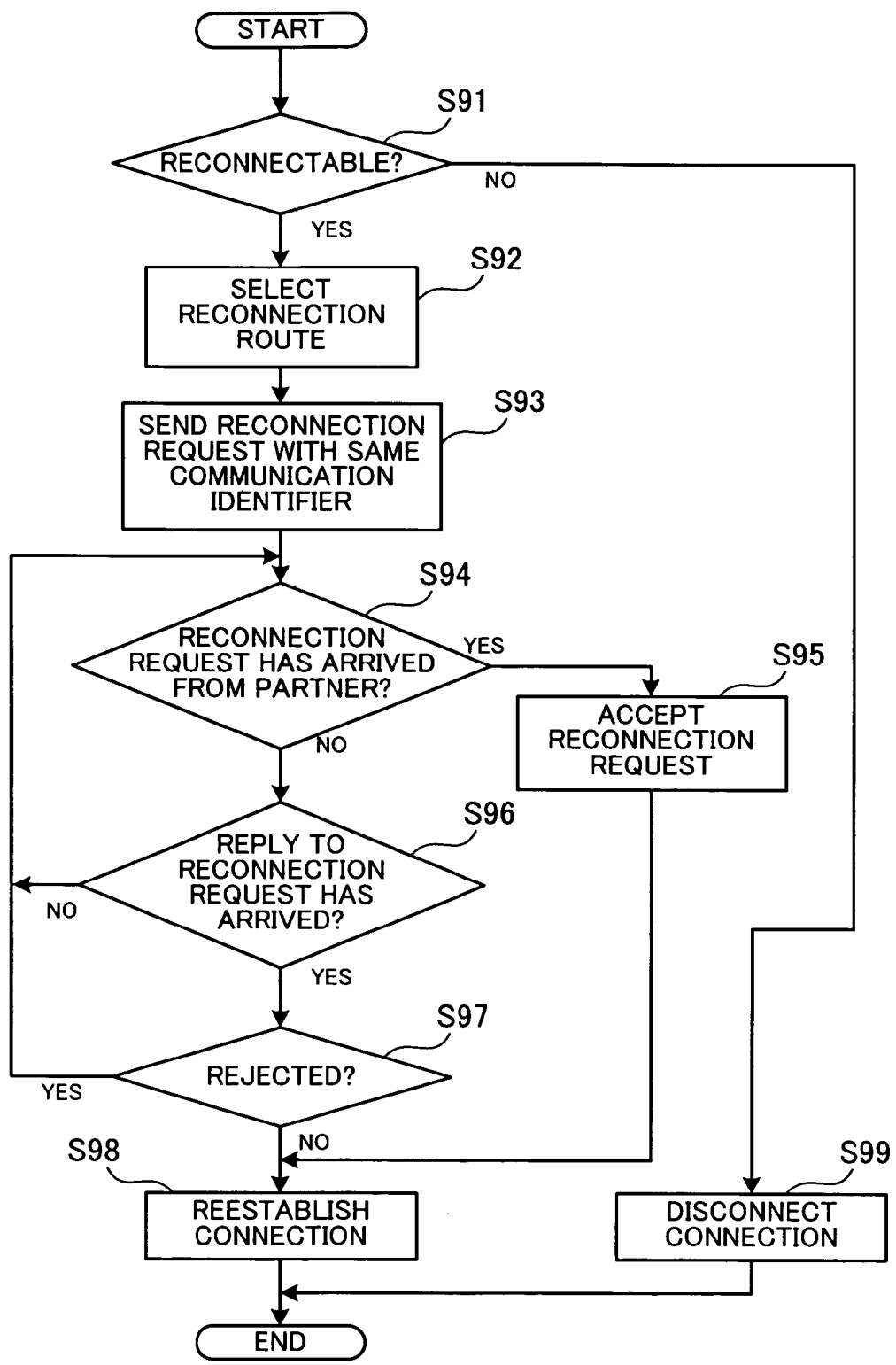
FIG. 23 is a flowchart showing a client computer process to be performed when detecting a connection failure.

FIG. 23 is a flowchart showing how a client computer operates when detecting a connection trouble. This process of FIG. 23 will be described following step numbers.

(Step S91) The client computer 200 which detected a trouble in a physical connection determines whether a connection to the server computer 100 can be made. When yes, this process goes on to step S92. When no, the process goes on to step S99.

(Step. S92) The computer 200 selects a reconnection route.

(Step S93) The computer 200 sends a reconnection request by using the same communication identifier which was used for the troubled physical connection.

(Step S94) The computer 200 determines whether a reconnection request has arrived from the partner (server computer 100). When yes, this process goes on to step S95. When no, the process goes on to step S96.

(Step S95) The computer 200 accepts the reconnection request sent from the server computer 100. Then this process goes on to step S98.

(Step S96) The computer 100 determines whether a reply to the reconnection request has come. When yes, this process goes on to step S97. When no, the process returns back to step S94.

(Step S97) The computer 100 determines whether the reply to the reconnection request is a notification of reconnection rejection. When yes, this process returns back to step S94. When no, the process goes on to step S98.

(Step S98) The computer 100 reestablishes a connection (physical connection) via the communication route selected in step S92 and ends this process.

(Step S99) The computer 100 decides to disconnect the connection and ends this process.

A method of selecting a connection route will be now described.

To select a connection route, a connection route being used by few lines is selected based on the route management information table. For example, referring to the route management information table 112 of FIG. 7, a route with a route identifier "AX" is selected.

Figure 24:
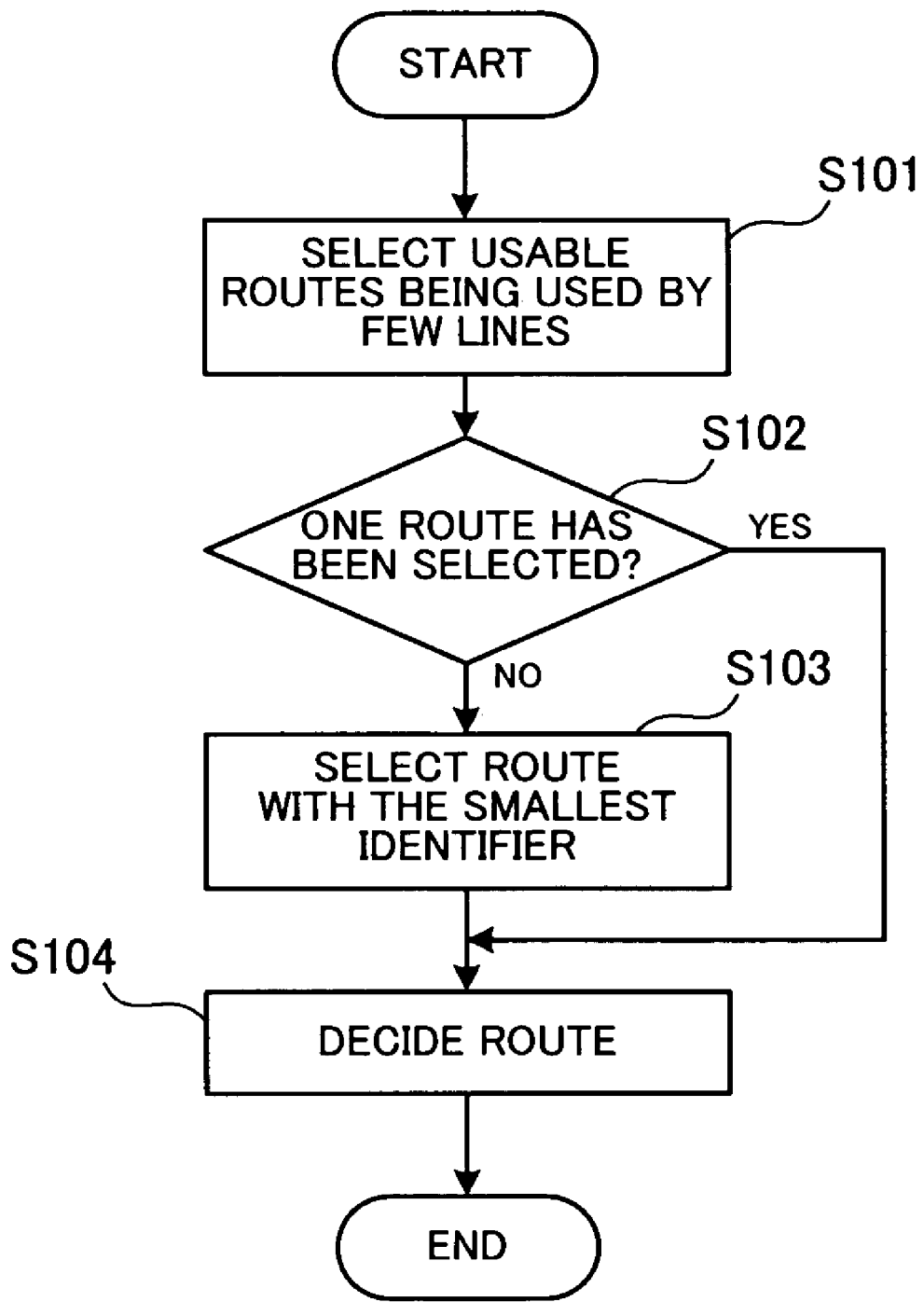
FIG. 24 is a flowchart showing how to select a connection route.

FIG. 24 is a flowchart showing how to select a connection route. A case where the computer 100 selects a connection route will be described. This process of FIG. 24 will be described following step numbers.

(Step S101) The computer 100 selects a route being used by the fewest lines, out of usable routes. In this connection, some routes may be selected.

(Step S102) The computer 100 determines whether one route has been selected. When one route has been selected, this process goes on to step S104. When some routes have been selected, the process goes on to step S103.

(Step S103) The computer 100 selects a route having the smallest route identifier (the first order in view of letter arrangement). For example, when route identifiers are indicated in alphabets, A is the smallest while Z is the largest.

(Step S104) The computer 100 determines one selected route as a connection route.

The above example is a case where one physical connection is established between computers. Alternatively, some physical connections may be established for one logical connection. In this case of establishing a plurality of physical connections via different routes, a plurality of physical communication management identifiers are registered in the physical communication column of a communication management information table.

FIG. 25 shows an example of the server communication management information table for a case where communication is performed via a plurality of routes. The communication management information table 111 of FIG. 25 shows that two physical connections with physical communication management identifiers "P1" and "P2" are established for a logical connection with a logical communication management identifier "C1."

FIG. 26 shows an example of the client communication management information table for a case where communication is performed via a plurality of routes. The communication management information table 211 of FIG. 26 shows that two physical connections with physical communication management identifiers "P3" and "P4" are established for a logical connection with a logical communication management identifier "C2."

FIG. 27 shows an example of the server physical management information table for a case where communication is performed via a plurality of routes. The physical management information table 113 of FIG. 27 shows that physical management information on two physical connections with the same logical communication management identifier "C1" is registered. These connections are different in connection route.

FIG. 28 shows an example of the client physical management information table for a case where communication is performed via a plurality of routes. The physical management information table 213 of FIG. 28 shows that physical management information on two physical connections with the same logical communication management identifier "C2" is registered. These connections are different in connection route.

A method for transferring data in a case where a plurality of physical connections exist for one logical connection will be now described.

In the data transfer method in communication via a plurality of routes, a negotiation packet for performing division is first sent. The negotiation packet is sent from a sending end with a physical connection with the smallest communication number and requires a reply. Only a case where data is to be transferred via a plurality of routes requires a reply.

Examples of data division and transfer will be now described. In the following examples, a request packet is sent from a sending end to a receiving end. The request packet includes information on transfer size and division size. The transfer size is the size of all data to be transferred. The division size is the maximum size of data which is transmittable via one physical connection. The receiving end receiving the request packet sends a reply packet to the sending end. The reply packet includes information on reception size. The reception size is the size of data which is receivable on the receiving end.

Figure 29:
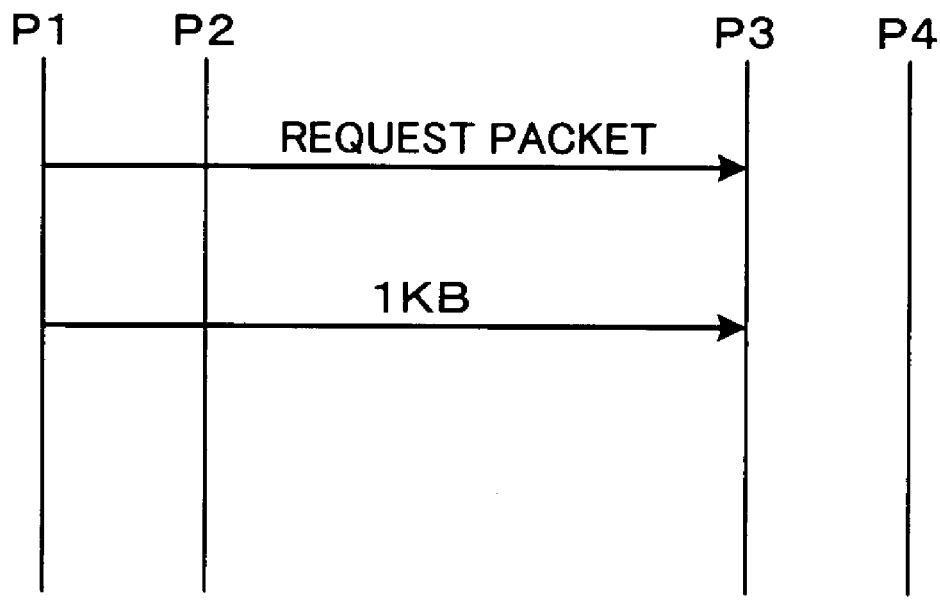
FIG. 29 shows an example of data transfer in a case where data division is unnecessary.

FIG. 29 shows an example of data transfer for a case where division is unnecessary. This example is made with two physical connections, transfer size of 1 KB, division size of 1 MB, and reception size of 1 KB. When the division size is larger than the transfer size, data is transferred from the sending end to the receiving end after a request packet. Since transfer size<division size, data is not divided even if two physical connections are established but the data is transferred via one physical connection ("P1" of the sending end and "P3" of the receiving end).

Figure 30:
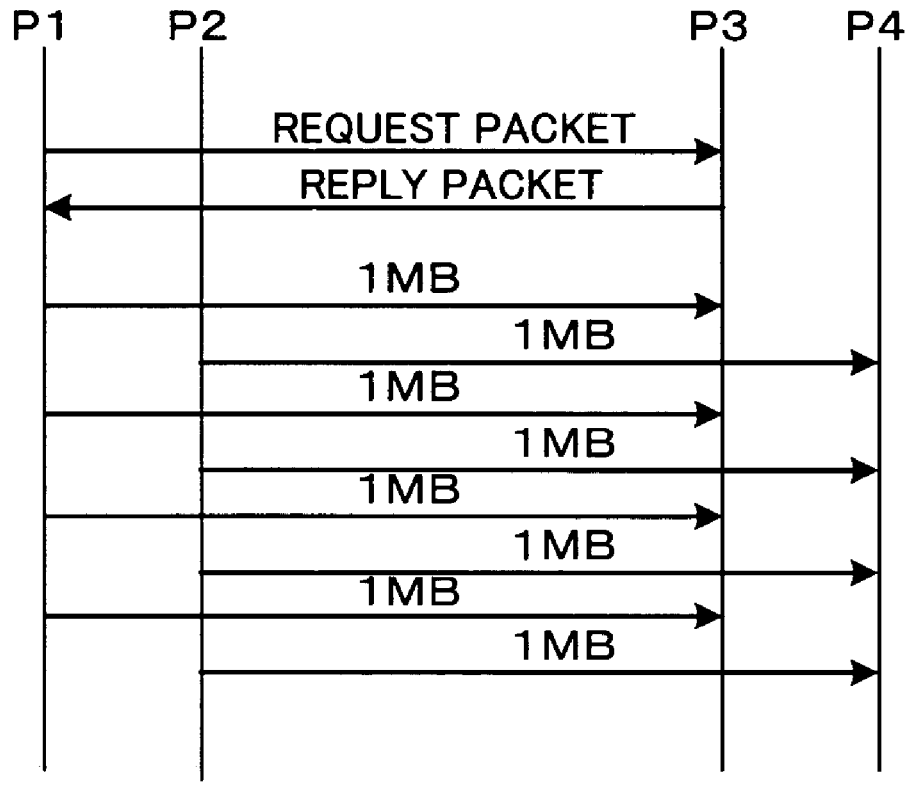
FIG. 30 shows the first example of data division and transfer.

FIG. 30 shows the first example for the data division and transfer. This example is made with two physical connections, transfer size of 8 MB, division size of 1 MB, and reception size of 8 MB. In this case where the transfer size is larger than the division size, data is divided and transferred with the two physical connections. In this case, the sending end sends a request packet and the receiving end sends a reply packet.

The sending end recognizes that the receiving end is able to receive data of the transfer size, based on the reception size indicated by the reply packet, and starts the data division and transfer. In this example of FIG. 30, 1 MB data transfer from the sending end "P1" to the receiving end "P3" and 1 MB data transfer from the sending end "P2" to the receiving end "P4" are alternately performed. Then 8 MB data transfer is completed in the 8th transfer.

Figure 31:
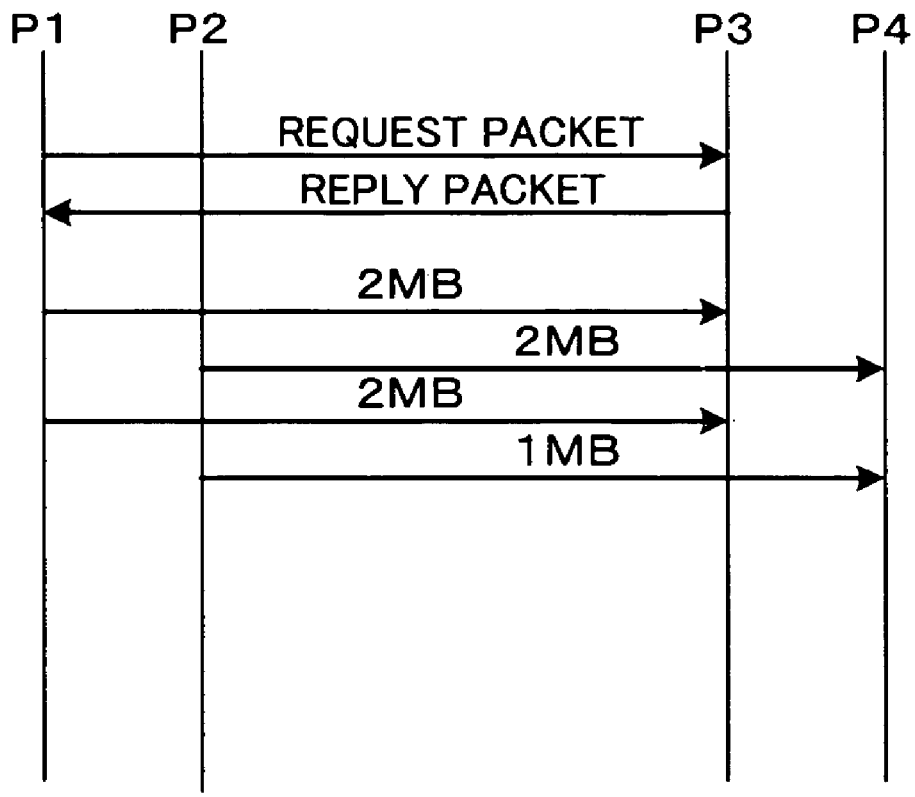
FIG. 31 shows the second example of the data division and transfer.

FIG. 31 shows the second example for the data division and transfer. This example is made with two physical connections, transfer size of 7 MB, division size of 2 MB, and reception size of 7 MB. In this case where there is a reminder when the transfer size is divided by the division size, only the remaining data is transferred in the last data transfer. In this example of FIG. 31, 2 MB data transfer from the sending end "P1" to the receiving end "P3" and 2 MB data transfer from the sending end "P2" to the receiving end "P4" are alternately performed. Then after 2 MB data transfer is performed three times, the remaining 1 MB data is transferred in the fourth data transfer.

Figure 32:
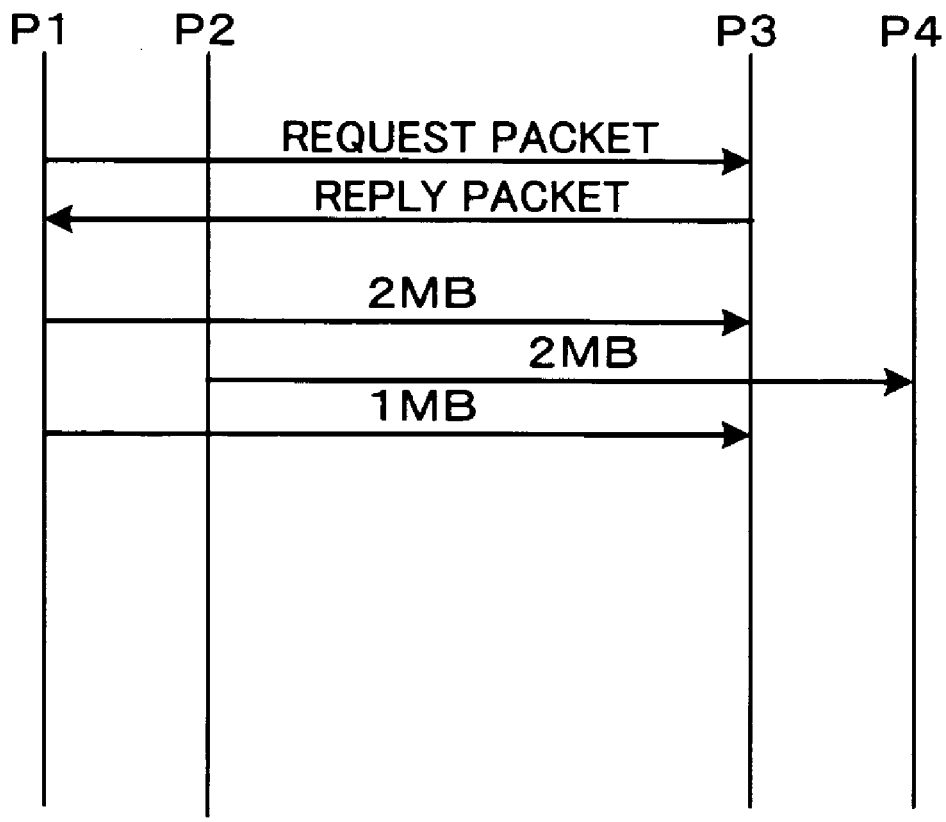
FIG. 32 shows the third example of the data, division and transfer.

FIG. 32 shows the third example for the data division and transfer. This example is made with two physical connections, transfer size of 8 MB, division size of 2 MB, and reception size of 5 MB. In this case where the transfer size is larger than the reception size, only data of the reception size is transferred. In this example of FIG. 32, 2 MB data transfer from the sending end "P1" to the receiving end "P3" and 2 MB data transfer from the sending end "P2" to the receiving end "P4" are alternately performed. Then after the 2 MB data transfer is performed twice, the remaining 1 MB data is transferred in the third data transfer. That is, 5 MB data in total is transferred.

Next a flow of a sending computer process and a receiving computer process to perform the data division and transfer will be now described.

Figure 33:
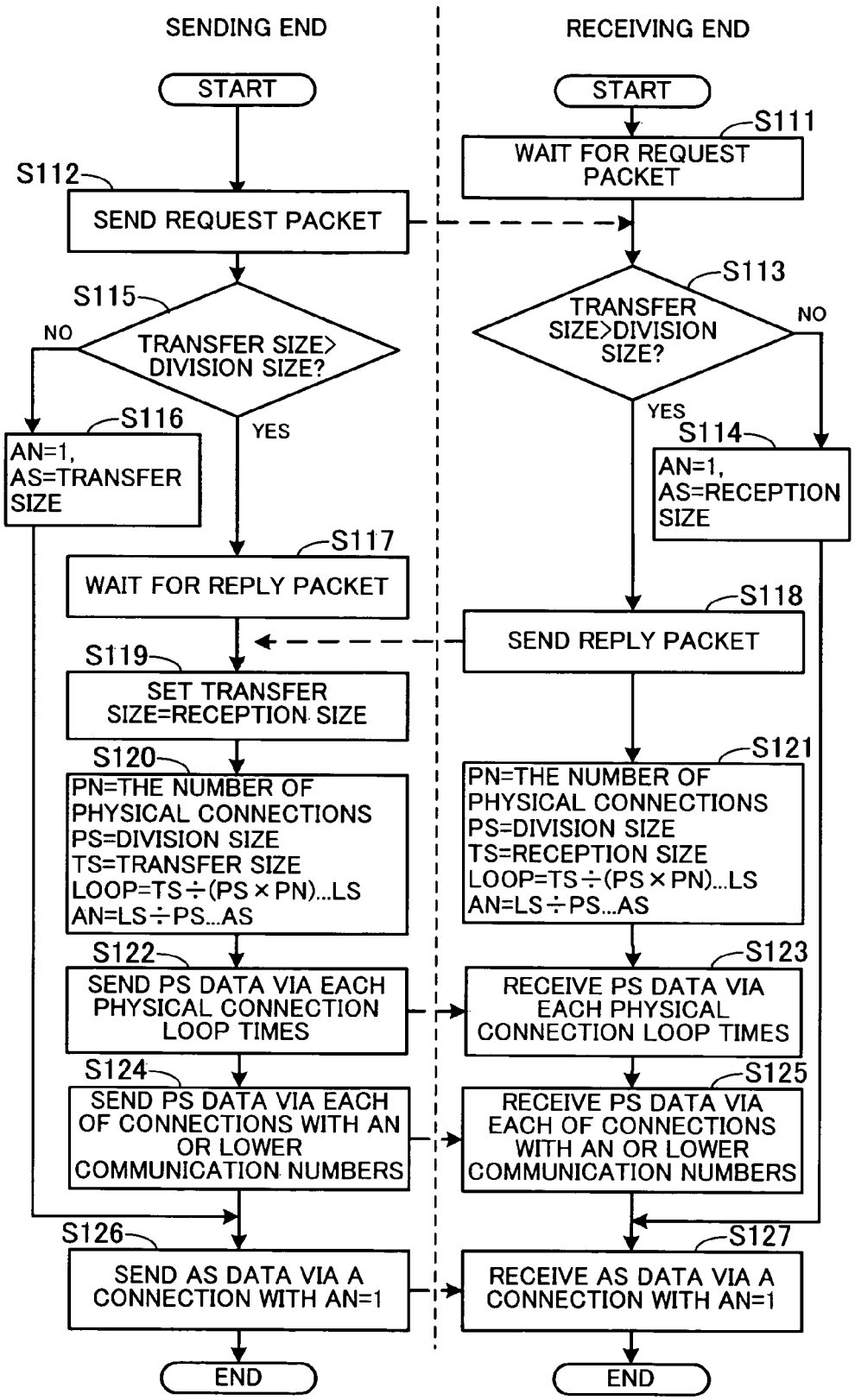
FIG. 33 is a sequence diagram showing a procedure of the data division and transfer.

FIG. 33 is a sequence diagram showing the data division and transfer process. This process of FIG. 33 will be described following step numbers. A case where data is transferred from the computer 100 to the computer 200 will be described.

(Step S111) The receiving computer 200 is in standby mode for receiving a request packet.

(Step S112) The sending computer 100 sends a request packet to the receiving computer 200 in response to a request from the user process.

(Step S113) The computer 200 receiving the request packet compares the transfer size to the division size, the sizes specified by the request packet. When the transfer size is larger than the division size, this process goes on to step S118. When the division size is larger, the process goes on to step S114.

(Step S114) The computer 200 sets AN=1 and AS=reception size and then this process goes on to step S127.

(Step S115) Similarly to the receiving computer 200, the computer 100 sending the request packet also compares the transfer size to the division size. When the transfer size is larger than the division size, this process goes on to step S117. When the division size is larger, the process goes on to S116.

(Step S116) The computer 10 sets AN=1 and AS=transfer size, and then this process goes on to S126.

(Step S117) The computer 100 enters standby mode for receiving a reply packet from the computer 200.

(Step S118) The computer 200 sends a reply packet including reception size information to the computer 100.

(Step S119) The computer 100 receiving the reply packet equalizes the transfer size to the reception size.

(Step S120) The computer 100 calculates LOOP and AN values by taking PN as the number of physical connections, PS as division size and TS as transfer size (equal to reception size). LOOP is the quotient of TS÷(PS×PN), and its reminder is taken as LS. AN is the quotient of LS÷PS, and its reminder is taken as AS.

(Step S121) The computer 200 calculates LOOP and AN values by taking PN as the number of physical connections, PS as division size, and TS as reception size. LOOP is the quotient of TS÷(PS×PN), and its reminder is taken as LS. AN is the quotient of LS÷PS, and its reminder is taken as AS.

(Step S122) The computer 100 transfers data of division size via each established physical connection, for a number of times specified by LOOP.

(Step S123) The computer 200 receives data of division size via each established physical connection, for a number of times specified by LOOP.

(Step S124) The computer 100 transfers data of division size via each of physical connections with AN and lower communication numbers.

(Step S125) The computer 200 receives data of division size via each of physical connections with AN and lower communication numbers.

(Step S126) The computer 100 transfers data of AS via a physical connection with an AN=1 communication number.

(Step S127) The computer 200 receives data of AS via a physical connection with an AN=1 communication number.

As described above, by establishing a plurality of physical connections for one logical connection, effective data transfer can be realized by using the physical connections.

The above-described processing functions are actually implemented on a computer. For this purpose, a program describing processing contents of the intended functions of the computer is provided. The processing functions are implemented on the computer by running the program. The program describing the processing contents is stored in a computer-readable storage medium. Suitable computer-readable storage media include magnetic storage media, optical discs, magneto-optical storage media, and semiconductor memory devices. Magnetic storage media include hard disk drives (HDD), flexible disks (FD), and magnetic tapes. Optical discs include DVDs (Digital Versatile Disc), DVD-RAMs (Random Access Memory), CD-ROMs (Compact Disc Read Only Memory), and CD-R (Recordable)/RW (ReWritable). Magneto-optical storage media include MOs (Magneto-Optical disc).

To distribute the program, portable storage media, such as DVDs and CD-ROMs, are sold. Network-based distribution of software program has also become popular, in which master program files stored in a server computer are downloaded to user computers via a network.

Each computer stores the program in its local storage unit, which has previously been installed from a portable storage medium or downloaded from a server computer. The computer performs intended functions by running the program read out of the local storage unit. As an alternative way of program execution, the computer may execute the program, reading out program files directly from a portable storage medium. Another alternative method is that the computer dynamically downloads and runs the program from a server computer to execute the functions.

As described above, according to this invention, one or more physical connections are defined as a logical connection, and when a trouble happens in a physical connection, reconnection is made via a different communication device, and communication is performed via the physical connections included in the logical connection in response to a communication request applied to the logical connection. Therefore, a process which sends the communication request recognizes that the logical connection is continuously kept alive. As a result, a retry process which is performed when a communication trouble happens is not required, resulting in continuing the communication and realizing high reliable communication between computers.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A non-transitory computer-readable storage medium storing a communication control program for performing communication with another device via a plurality of communication devices each connected to a different physical transmission route, the communication control program causing a computer to execute:

selecting a communication device from the plurality of communication devices and establishing a physical connection with an another device via the selected communication device and the physical transmission route connected thereto, in response to a connection request received from a client process at an application layer of the computer;

defining one or more established physical connections as a single logical connection, wherein the logical connection includes a partner connection identifier that identifies the another device in which the physical connection is established, an own communication identifier that identifies the requesting client at the application layer of the computer, and a partner communication identifier that identifies a process at an application layer of the another device operating as a communication partner;

determining whether information on a communication partner specified by the received communication request matches with any of the partner connection identifier and the partner communication identifier corresponding to the own communication identifier within the logical connection;

determining that the received communication request is directed to the logical connection when the partner connection identifier and the partner communication identifier corresponding to the logical connection match with the information on a communication partner specified by the received communication request;

performing communication with the another device through the physical connection included in the logical connection when the received communication request is directed to the logical connection; and establishing, upon failure of any established physical connection included in the logical connection, a new physical connection with the another device via a communication device and a physical transmission route which are separate and different from the communication device and physical transmission route of the failed physical connection, and including the newly established physical connection into the logical connection in which the failed physical connection was included.

2. The non-transitory computer-readable storage medium according to claim 1, the program further causing the computer to execute:

activating in the computer a server process associated with the client process, upon establishment of the physical connection, so as to receive a reconnection request from said another device, wherein the server process has its own communication identifier of the client process.

3. The non-transitory computer-readable storage medium according to claim 1, wherein the new physical connection is established when one of the established physical connections is disconnected.

4. The non-transitory computer-readable storage medium according to claim 1, wherein the new physical connection is established when all of the established physical connections are disconnected.

5. The non-transitory computer-readable storage medium according to claim 1, wherein the communication is performed by sharing loads among the established physical connections included in the logical connection, in response to the communication request applied to the logical connection when the communication request arrives.

6. A communication control method executed by a computer comprising a plurality of communication devices to perform communication with another device via the plurality of communication devices each connected to a different physical transmission route, the communication control method comprising:

selecting a communication device from the plurality of communication devices of the computer and establishing a physical connection with an another device via the selected communication device and the physical transmission route connected thereto, in response to a connection request received from a client process at an application layer of the computer;

defining one or more established physical connections as a single logical connection, wherein the logical connection includes a partner connection identifier that identifies the another device in which the physical connection is established, an own communication identifier that identifies the requesting client process at the application layer of the computer, and a partner communication identifier that identifies a process at an application layer of the another device operating as a communication partner;

determining whether information on a communication partner specified by the received communication request matches with any of the partner connection identifier and the partner communication identifier corresponding to the own communication identifier within the logical connection;

determining that the received communication request is directed to the logical connection when the partner connection identifier and the partner communication identifier corresponding to the logical connection match with the information on a communication partner specified by the received communication request;

performing communication with the another device through the physical connection included in the logical connection when the received communication request is directed to the logical connection; and establishing, upon failure of any established physical connection included in the logical connection, a new physical connection with the another device via a communication device and a physical transmission route which are separate and different from the communication device and physical transmission route of the failed physical connection, and including the newly established physical connection into the logical connection in which the failed physical connection was included.

7. A communication control device for performing communication with another device, the communication control device comprising:

a plurality of communication devices each connected to a different physical transmission route reaching said another device;

physical connection means for selecting a communication device from the plurality of communication devices and establishing a physical connection with said another device via the selected communication device and the physical transmission route connected thereto, in response to a connection request received from a client process at an application layer of the computer;

logical connection defining means for defining one or more established physical connections established by the physical connection means as a single logical connection, wherein the logical connection includes a partner connection identifier that identifies the another device in which the physical connection is established, an own communication identifier that identifies the requesting client process at the application layer of the computer, and a partner communication identifier that identifies a process at an application layer of the another device operating as a communication partner;

means for determining whether information on a communication partner specified by the received communication request matches with any of the partner connection identifier and the partner communication identifier corresponding to the own communication identifier within the logical connection;

means for determining that the received communication request is directed to the logical connection when the partner connection identifier and the partner communication identifier corresponding to the logical connection match with the information on a communication partner specified by the received communication request;

communication means for performing communication with the another device through the physical connection included in the logical connection when the received communication request is directed to the logical connection; and communication reconnection means for establishing, upon failure of any established physical connection included in the logical connection, a new physical connection via a communication device and a physical transmission route which are separate and different from the communication device and physical transmission route of the failed physical connection and including the newly established physical connection into the logical connection in which the failed physical connection was included.

* * * * *